United States Patent
Kempf et al.

(10) Patent No.: US 9,250,941 B2
(45) Date of Patent: Feb. 2, 2016

(54) APPARATUS AND METHOD FOR SEGREGATING TENANT SPECIFIC DATA WHEN USING MPLS IN OPENFLOW-ENABLED CLOUD COMPUTING

(71) Applicant: TELEFONAKTIEBOLAGET L M ERICSSON (PUBL), Stockholm (SE)

(72) Inventors: James Kempf, Mountain View, CA (US); Ramesh Mishra, San Jose, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 280 days.

(21) Appl. No.: 13/750,325

(22) Filed: Jan. 25, 2013

(65) Prior Publication Data

US 2013/0125124 A1 May 16, 2013

Related U.S. Application Data

(63) Continuation-in-part of application No. 13/251,107, filed on Sep. 30, 2011, now Pat. No. 8,560,663.

(60) Provisional application No. 61/730,394, filed on Nov. 27, 2012.

(51) Int. Cl.
| | | |
|---|---|---|
| H04L 12/28 | (2006.01) |
| G06F 9/455 | (2006.01) |
| G06F 17/30 | (2006.01) |
| H04L 12/725 | (2013.01) |
| H04L 12/723 | (2013.01) |
| H04L 12/741 | (2013.01) |
| H04L 12/931 | (2013.01) |
| H04L 29/12 | (2006.01) |
| H04L 12/715 | (2013.01) |

(52) U.S. Cl.
CPC ...... *G06F 9/45533* (2013.01); *G06F 17/30289* (2013.01); *H04L 45/306* (2013.01); *H04L 45/50* (2013.01); *H04L 45/54* (2013.01); *H04L 45/64* (2013.01); *H04L 49/70* (2013.01); *H04L 61/103* (2013.01); *H04L 61/2015* (2013.01)

(58) Field of Classification Search
None
See application file for complete search history.

(56) References Cited

U.S. PATENT DOCUMENTS

| | | | |
|---|---|---|---|
| 6,185,184 | B1 | 2/2001 | Mattaway et al. |
| 6,693,878 | B1 | 2/2004 | Daruwalla et al. |
| 8,194,680 | B1 | 6/2012 | Brandwine et al. |
| 8,356,120 | B2 | 1/2013 | Tsirkin et al. |

(Continued)

OTHER PUBLICATIONS

"Open Flow Switch Specification", Version 1.0.0 (Wire Protocol Ox01 ), Dec. 31, 2009, 42 pages.
"OpenFlow Switch Specification", Version 1.1.0 Implemented (Wire Protocol Ox02), Feb. 28, 2011, 56 pages.

(Continued)

*Primary Examiner* — Kibrom T Hailu

(57) ABSTRACT

A tenant database is used to add tenant ID information to the cloud network manager (CNM) address mapping table to isolate tenant specific data to a tenant ID to the CNM. The CNM maintains a mapping among a plurality of items in a plurality of databases or tables. The plurality of databases or tables include a tenant database (DB), a tenant identifier to tenant label (TITL) table, a top of rack server label to virtual switch link label (TLVLL) table, a label mapping table (SMVL), and a CNM address mapping table. The CNM uses the plurality of databases to generate tenant specific labels that are added to packets sent between tenant virtual machines (VMs).

11 Claims, 22 Drawing Sheets

(56) References Cited

U.S. PATENT DOCUMENTS

| | | |
|---|---|---|
| 2003/0137536 A1 | 7/2003 | Hugh |
| 2010/0103837 A1 | 4/2010 | Jungck et al. |
| 2011/0271007 A1 | 11/2011 | Wang et al. |
| 2012/0179855 A1 | 7/2012 | Tsirkin et al. |
| 2012/0180042 A1 | 7/2012 | Tsirkin et al. |
| 2012/0180043 A1 | 7/2012 | Tsirkin et al. |
| 2012/0221955 A1 | 8/2012 | Raleigh et al. |
| 2013/0058354 A1* | 3/2013 | Casado et al. ............... 370/401 |
| 2013/0086236 A1 | 4/2013 | Baucke et al. |
| 2013/0103817 A1 | 4/2013 | Koponen et al. |
| 2013/0103818 A1 | 4/2013 | Koponen et al. |
| 2013/0142203 A1* | 6/2013 | Koponen et al. ............. 370/401 |

OTHER PUBLICATIONS

Andersson, L. Ed., et al., "Framework for Layer 2 Virtual Private Networks (L2VPNs)", Network Working Group, RFC 4664, Category: Informational, Sep. 2006, 44 pages.

Gallon, R., et al., "A Framework for Layer 3 Provider-Provisioned Virtual Private Networks (PPVPNs)", Network Working Group, RFC 4110, Category: Informational, Jul. 2005, 82 pages.

Heller B., "OpenFlow Switch Specification", Version 0.8.9 (Wire Protocol Ox97), Dec. 2, 2008, 33 pages.

Heller B., "OpenFlow Switch Specification", Version 0.9.0 (Wire Protocol Ox98), Jul. 20, 2009, 36 pages.

Patrick, M., et al., "DHCP Relay Agent Information Option", Network Working Group, RFC 3046, Category: Standards Track, Jan. 2001, 14 pages.

* cited by examiner

Figure 21

APPARATUS AND METHOD FOR SEGREGATING TENANT SPECIFIC DATA WHEN USING MPLS IN OPENFLOW-ENABLED CLOUD COMPUTING

CROSS-REFERENCES TO RELATED APPLICATIONS

This continuation-in-part application claims the benefit of U.S. patent application Ser. No. 13/251,107 filed on Sep. 30, 2011, and U.S. Provisional Application 61/730,394 filed Nov. 27, 2012, which are incorporated herein by reference.

FIELD

Embodiments of the invention relate to the field of cloud computing; and more specifically, to virtual private network isolation in cloud computing.

BACKGROUND

Large corporations have for many years been concentrating their compute resources in data centers. This trend has accelerated over the last few years as server virtualization technology has become more and more prevalent. As data centers have become larger, some data center operators have begun to offer computing, storage, and network communication resources to outside customers. The offered services typically consist of elastic, on demand processing, storage that for most practical purposes is limited only by the customer's ability to pay, and network bandwidth into the Internet. This development is called cloud computing.

Server virtualization technology allows a pool of servers to be managed as essentially one large computer resource. A layer of software called a hypervisor sits between the operating system and the hardware. The hypervisor schedules the execution of virtual machines ("VMs") on a virtualized server. A VM is an operating system image packaged with some applications. The hypervisor allows a VM to be suspended and moved between servers to load balance. Load balancing and monitoring of VM execution to catch crashes provides the same kind of fault tolerance and scalability services for enterprise applications that are achieved at much higher cost with specialized solutions. A cloud manager system oversees the execution of VMs; scheduling execution to meet demand, to optimize server utilization, and to minimize power consumption. The cloud execution manager can schedule execution to allow in-service upgrade of hardware and software without impacting ongoing service provision.

In order to support arbitrary movement of VMs between machines, the networking within the data center must also be virtualized. Most clouds today virtualize the network by incorporating a virtual switch into the hypervisor. The virtual switch provides virtual network ports to the VMs executing under the control of the hypervisor. The virtual switch software also allows the network resources to be virtualized in a manner similar to how the server resources are virtualized by the hypervisor. The hypervisor and the virtual switch can thereby cooperate to allow VMs to be moved between servers. When the hypervisor moves a VM, it communicates with the virtual switch about the new location, and the virtual switch ensures that the network routing tables for the VM's addresses (layer 2 Media Access Control ("MAC") address, potentially also the internet protocol ("IP") address) are updated so packets are routed to the new location.

Many cloud computing facilities only support Web services applications. Web services applications consist of a load balancing front end that dispatches requests to a pool of Web servers. The requests originate conceptually from applications on the Internet and therefore the security and privacy requirements are much looser than for applications in a private corporate network. A newer trend is secure multi-tenancy, in which the cloud provider offers virtual private network ("VPN") like connections between the client's distributed office networks outside the cloud and a VPN within the cloud. This allows the client's applications within the cloud to operate in a network environment that resembles a corporate wide area network ("WAN"). For private data centers, in which services are only offered to customers within the corporation owning the data center, the security and privacy requirements for multi-tenancy are relaxed. For public data centers, the cloud operator must ensure that the traffic from multiple tenants is isolated and there is no possibility for traffic from one client to reach another. In either case, cloud computing facilities tend to implement cloud computer networks using MAC layer virtual local area networks ("VLANs").

For example, two Virtual Private Clouds ("VPCs") can be set up for two different external enterprise customers. A VPC consists of a collection of VMs, storage, and networking resources that provide secure multi-tenancy to the enterprises renting space in the cloud. The enterprise customers connect into the VPCs via VPNs over the Internet running on a public operator network.

In order to add a new service instance (a new VM) to a VPC, a cloud execution manager initializes the VM to run on a hypervisor on a virtualized server. The virtual switch on the virtualized server is configured to include the VM in a VLAN that is part of the VPN for the enterprise adding the new VM. In some cases, a virtual customer edge router is updated for the new service and a provider edge router in the cloud computing facility is updated with the new service.

In order to provide VPNs, cloud computing facilities implement one of three solutions. First, each tenant receives a separate VLAN slice. Second, tenant VPNs are implemented using IP encapsulation. Third, tenant VPNs are implemented using MAC address encapsulation. Each of these solutions suffers from deficiencies.

If the cloud uses VLAN isolation, each tenant is assigned a separate VLAN tag and the cloud network is run as a flat Layer 2 network. The VLAN tag has 12 bits, so if a cloud operator uses VLAN isolation the number of tenants is restricted to 4096. This limit provides a major limitation.

Another problem with VLAN isolation is that standard area networking (e.g., LAN, WAN, MAN; Institute of Electrical and Electronics Engineers ("IEEE") 802.1) switching uses the spanning tree protocol ("STP") to set up routes. In order to remove the possibility of routing loops, STP designates one and only one path between a source address and a destination address, regardless of whether there are multiple routes. This can lead to congestion and underutilization of the switching fabric when the spanning tree route comes under traffic pressure and alternate routes are neglected.

With IP encapsulation, the cloud is run as a routed IP network and IP tunnels are used to isolate tenant's traffic. The traffic from a tenant is encapsulated in an IP packet (typically using Generic Routing Encapsulation ("GRE")) with the endpoints of the tunnel being the source and destination virtual switches on the source and destination virtualized servers where the VMs are running.

IP encapsulation allows a client to define an arbitrary layer 2 service on top by encapsulating Ethernet frames in Layer 2

Tunneling Protocol ("L2TP"). It also allows large numbers of tenants, constrained only by the cloud-wide IP address space. The tenant can also deploy their own IP address space on top of the IP tunnels. However, without other measures, IP routing also selects a single route and so multipath routes are neglected, leading to unnecessary congestion. The cloud routing can utilize Equal Cost Multipath to spread packets over multiple links but at the cost of additional configuration complexity.

In general, configuring an IP routed network is time consuming and routers tend to be more expensive devices than simple switches. In addition, IP networks have limited means to provision dedicated bandwidth, which might be necessary for large data flows.

With MAC encapsulation, the separate tenant VPNs are run as encapsulated inside MAC tunnels, similar to IP encapsulation. The endpoints of the MAC tunnels are typically the virtual switches on the source and destination virtualized servers where the VMs are running.

MAC encapsulation offers similar benefits to IP encapsulation over VLAN isolation, with the added benefit that the cloud can be run as a flat Layer 2 network if desired. The disadvantage is that there are few standards for the signaling protocols for MAC encapsulation, unlike IP, and, although there are standards for data plane encapsulation, they are not used in some existing cloud management software products. This runs the risk of not working with certain types of hardware. Configuring and maintaining a MAC encapsulation network is also more complex than maintaining a VLAN isolated network.

SUMMARY

Embodiments of the invention include a method performed by a cloud network manager ("CNM") to manage multi-protocol label switching ("MPLS") flow entries in a cloud network. The CNM is coupled to a first virtualized server for hosting one or more virtual machines ("VM"), wherein the first virtualized server comprises a first virtual switch that supports MPLS and the first virtual switch is coupled to a first top of rack switch ("TORS") that supports MPLS. The CNM receives a first notification message, wherein the first notification message indicates that a first VM belonging to a particular tenant has been scheduled for activation on the first virtualized server. In response to receiving the first notification message, the CNM determines a first VM media access control ("MAC") address associated with the first VM. Further the CNM determines a first virtual switch MAC address associated with the first virtual switch. The CNM records, in an address mapping table, an association between the tenant identifier, first VM MAC address, and the first virtual switch MAC address. The CNM further determines a first MPLS label that associates the first TORS with the first virtual switch, and a tenant MPLS label identifying the tenant. The CNM sends a first flow entry modification message to the first virtual switch indicating that data packets matching the first MPLS label, the tenant MPLS label, and the first VM MAC address should be forwarded the first VM after popping the tenant MPLS label and the first MPLS label.

Embodiments of the invention include a system for managing a multi-protocol label switching ("MPLS") cloud network including a plurality of top of rack switches ("TORS"), a plurality of virtualized servers, a cloud execution manager ("CEM") coupled to the plurality of virtualized servers, and a cloud network manager ("CNM") coupled to the plurality of TORSs.

The plurality of virtualized servers each coupled to one of the plurality of TORSs and comprising a hypervisor and a virtual switch. The hypervisor configured to execute one or more virtual machines ("VM") on the virtualized server. The virtual switch configured to support MPLS and to transmit data packets from the one or more VMs to the TORS coupled with this virtualized server.

The CEM is coupled to the plurality of virtualized servers. Further the CEM schedules execution of the one or more VMs, each VM to be executed on one of the plurality of virtualized servers. The CEM further suspends execution of the one or more VMs and moves execution of the one or more VMs from one of the plurality of virtualized servers to another one of the plurality of virtualized servers.

The CNM is coupled to the plurality of TORSs, the plurality of virtualized servers, and the CEM. The CNM receives a first notification message from the CEM, wherein the first notification message is to indicate that a first VM has been scheduled for activation on a first of the plurality of virtualized servers, and the identifier of the tenant. In response to the first notification message, the CNM performs the follow. The CNM determines a first VM media access control ("MAC") address associated with the first VM. The CNM determines first virtual switch MAC address associated with the first virtual switch in the first virtualized server. The CNM records, in an address mapping table, an association between the tenant identifier, the first VM MAC address, and the first virtual switch MAC address. The CNM determines a first MPLS label to associate a first TORS with the first virtual switch, wherein the first TORS is to be coupled with the first virtualized server. The CNM additionally determines the MPLS label associated with the tenant identifier. The CNM send a first flow entry modification message to the first virtual switch to indicate that data packets that match the first MPLS label, the tenant label, and the first VM MAC address should be forwarded the first VM after popping the first MPLS label and the tenant label.

Embodiments of the invention include using a tenant database to add tenant ID information to the cloud network manager (CNM) address mapping table to isolate tenant specific data to a tenant ID to the CNM.

In one embodiment, a method for isolating tenant specific data using a cloud network manager (CNM) is disclosed. The CNM maintains a mapping among a plurality of items in a plurality of databases or tables. The plurality of databases or tables include a tenant database (DB), a tenant identifier to tenant label (TITL) table, a top of rack server label to virtual switch link label (TLVLL) table, a label mapping table (SMVL), and a CNM address mapping table. The CNM uses the plurality of databases to generate tenant specific labels that are added to packets sent between tenant virtual machines (VMs). In one embodiment, database accesses are performed prior to installing or uninstalling flows on Openflow switches.

The CNM uses the TITL table to look up the tenant label using a tenant ID as a key. The CNM uses the TLVLL table to look up the virtual switch (VS) link label using the top of rack server (TORS) label as the key.

The CNM uses the CNM address mapping table to maintain a mapping among a tenant ID, a tenant VM media access control (MAC) address, a tenant VM Internet Protocol (IP) address, and a server MAC address. There is one CNM address mapping table per tenant.

Tenant specific data is isolated by adding a tenant label as a forwarding entry. Using the tenant label that has a tenant ID segregates and isolates tenant specific traffic to a respective VM. In one embodiment, VMs that belong to different tenants have the same internet protocol and media access control addresses.

The tenant DB keeps pointers to the CNM address mapping table. The CNM first performs a lookup to the tenant DB to find a tenant specific address mapping table before performing all other CNM address mapping table lookups.

In one embodiment, a method for isolating tenant specific data using a cloud network manager (CNM) is disclosed. A notification that a virtual machine (VM) is scheduled for activation on a virtualized server is received. The CNM determines a VM media access control (MAC) address. The CNM determines a virtual switch (VS) MAC address that resides on the virtualized server. The CNM receives a message including a tenant identifier (ID), a tenant MAC, and a server MAC. A lookup is performed in a label mapping table and a tenant identifier to tenant label (TITL) table for a VS to top of rack switch (TORS) label and a tenant specific label. An association is recorded between the tenant ID, the VM MAC address, and the VS MAC address in a CNM mapping table. The CNM sends a flow entry modification message to the VS to indicate that data packets matching the VS to TORS label, the tenant specific label, and the VM MAC address should be forwarded to the VM.

In one embodiment, the CNM sends a flow entry modification message to the VS to indicate that Dynamic Host Configuration Protocol (DHCP) requests originating from the VM should be forwarded to the CNM. In one embodiment, the CNM sends a flow entry modification message to the VS to indicate that Address Resolution Protocol (ARP) requests originating from the VM should be forwarded to the CNM.

In one embodiment, a method for isolating tenant specific data using a cloud network manager (CNM) is disclosed. A first flow entry modification message is sent to a source virtual switch (VS) to indicate that the source VS should first push a tenant specific label and then push a VS to top of rack switch (TORS) label onto data packets in order to forward the data packets to a destination virtual machine (VM). A second flow entry modification message is sent to a source TORS to indicate that when the source TORS receives data packets matching the VS to TORS label, the source TORS should push a destination TORS label. A third flow entry modification message is sent to a destination TORS to indicate that when the destination TORS receives data packets matching the destination TORS label, the destination TORS should pop the TORS label and forward the data packets to a destination VS. A fourth flow entry modification message is sent to the destination VS to indicate that when the destination VS receives data packets matching the VS to TORS label and the tenant specific label, the destination VS should first pop the VS to TORS label and then pop the tenant specific label.

In response to the first flow entry modification message the source VS forwards the packets to a source TORS. In response to the second flow entry modification message, the source TORS forwards the data packets to a destination TORS using a cloud network. In response to the third flow entry modification message, the destination TORS forwards the data packets to a destination VS. In response to the fourth flow entry modification message, the destination VS forwards the packets to the destination VM. The CNM provides a destination Internet Protocol address to a source VM in order to allow the source VM to forward packets to a destination VM belonging to a same tenant.

BRIEF DESCRIPTION OF THE DRAWINGS

The invention may best be understood by referring to the following description and accompanying drawings that are used to illustrate embodiments of the invention. In the drawings:

FIG. 21 illustrates datapath flows when moving a VM.

DESCRIPTION OF EMBODIMENTS

Figure 1:
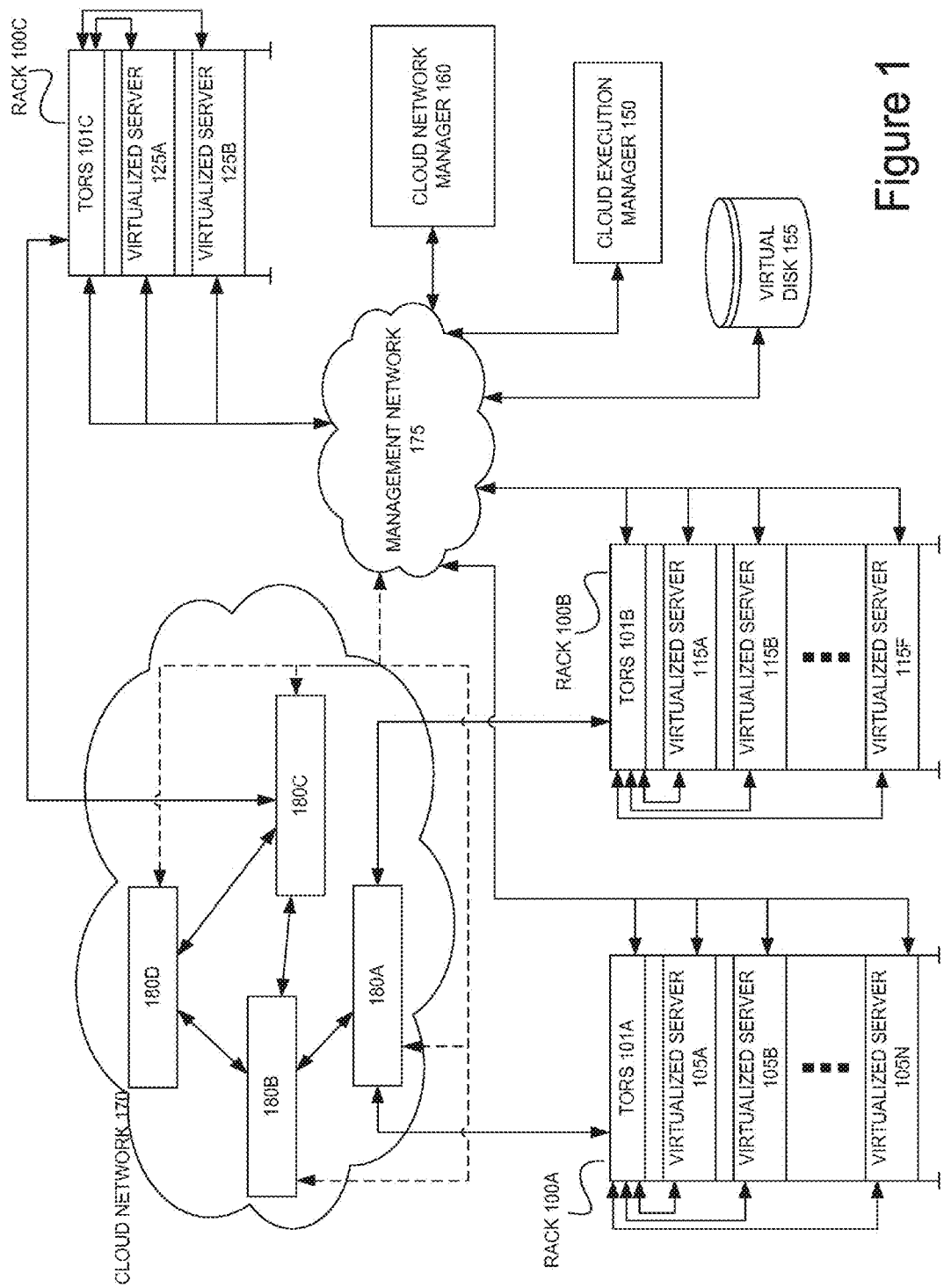
FIG. 1 illustrates components in a cloud computing facility according to one embodiment of the invention.

The following description describes methods and apparatus for managing multi-protocol label switching ("MPLS")

flow entries in a cloud network. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

To ease understanding, dashed lines have been used in the figures to signify the optional nature of certain items (e.g., features not supported by a given implementation of the invention; features supported by a given implementation, but used in some situations and not in others).

The techniques shown in the figures can be implemented using code and data stored and executed on one or more electronic devices. Such electronic devices store and communicate (internally and/or with other electronic devices over a network) code and data using non-transitory tangible machine readable medium (e.g., magnetic disks; optical disks; read only memory; flash memory devices; phase-change memory) and transitory machine-readable communication medium (e.g., electrical, optical, acoustical or other forms of propagated signals-such as carrier waves, infrared signals, digital signals, etc.). In addition, such electronic devices typically include a set or one or more processors coupled with one or more other components, such as a storage device, one or more input/output devices (e.g., keyboard, a touchscreen, and/or a display), and a network connection. The coupling of the set of processors and other components is typically through one or more busses or bridges (also termed bus controllers). The storage device and signals carrying the network traffic respectively represent one or more non-transitory tangible machine readable medium and transitory machine-readable communication medium. Thus, the storage device of a given electronic device typically stores code and/or data for execution on the set of one or more processors of that electronic device. Of course, one or more parts of an embodiment of the invention may be implemented using different combination of software, firmware, and/or hardware.

In embodiments of the invention, a cloud computer facility uses MPLS to form VPNs for VPC tenants, and programs flow routes in the virtual switch and top of rack switch. For example, MPLS switches can program flow routes with OpenFlow as described in OpenFlow Switch Specification Version 1.1.0, February 2011. A virtual switch uses Ethernet MAC addresses to route packets to VMs on a virtualized server, and to classify packets into particular MPLS label switch paths ("LSPs"), but after the virtual switch, neither Ethernet nor IP addresses are used for routing. Instead, routing is done strictly using MPLS labels that are assigned based on the IP and MAC destination addresses. The process is similar to but not identical with the Virtual Private Wire Service ("VPWS") or Layer 3 VPNs ("L3VPNs") in wide area networks. "Framework for Layer 2 Virtual Private Networks (L2VPNs)," Internet Engineering Task Force ("IETF"), Request For Comments ("RFC") 4664, describes VPWS for wide area networks, while "A Framework for Layer 3 Provider-Provisioned Virtual Private Networks (PPVPNs)," IETF, RFC 4110 describes L3VPNs.

For example, a Cloud Network Manager ("CNM") installs flow routes using OpenFlow into a Virtual Switch on a virtualized server where a VM is running. The flow routes encapsulate Ethernet frames from tenant VMs on the virtualized server with a MPLS label designating the route and specific to the tenant between the TORS and a virtual switch on the destination side and a label designating the identity of the tenant who owns the VMs. The packets are then forwarded to the source VM's virtualized server's TORS. The source TORS then routes the packets into the data center network fabric. If the cloud network fabric is an MPLS network, the source TORS pushes another MPLS label which specifies the route between the source TORS and the destination TORS. The destination TORS pops the MPLS routing label and uses the label pushed on by the source virtual switch to route the packet to the appropriate destination server and virtual switch. The destination virtual switch pops the TORS to virtual switch label and forwards the packet to the correct VM based on the destination MAC address. If the cloud switch fabric supports some other technology, such as optical, the TORS performs a suitable adaptation.

Embodiments of the invention provide numerous advantages. For example, no IP routing is required on the data plane thereby removing the cost, power usage, and complexity of having an IP routed cloud network. The design only requires inexpensive MPLS switches. The switch fabric in the cloud can be a standard Ethernet switch, an MPLS capable switch, an optical circuit-switch, or even a mixture, for example, optical for high capacity flows and electrical for other traffic. The switch fabric could even be a wide area network between distributed computing resources. The TORS handles the encapsulation appropriately. The tenant can manage its own IP address space (if desired) and DNS server (if desired). Routing details into the cloud switch fabric are handled by the TORS where the right mix of scalability and aggregation can be achieved.

FIG. 1 illustrates components in a cloud computing facility according to one embodiment of the invention. The cloud computing facility comprises a plurality virtualized servers in a plurality of racks coupled through a cloud network 170. Of these virtualized servers and racks, three racks 100A, 100B, and 100C are illustrated. Each illustrated rack comprises a top of rack switch ("TORS") and a plurality of virtualized servers. Rack 100A comprises a TORS 101A and a plurality of virtualized servers 105A-105N. Rack 100B comprises a TORS 101B and a plurality of virtualized servers 115A-115N. Rack 100C comprises a TORS 101C, virtualized server 125A, and virtualized server 125B. Each TORS 100A-100C couples the plurality of virtualized servers within that rack and is further coupled with a cloud network 170. The structure of the cloud network 170 can support any type of switching or routing protocol, for example an optical circuit-switched network or a network of OpenFlow MPLS switches. The cloud network 170 could even be a wide area network ("WAN") that runs between distributed server racks. The connectivity in the figure is not meant to be normative, there are many ways to couple TORS in a cloud network 170. In FIG. 1, the cloud network 170 comprises a plurality of switching elements (e.g. switches or routers) 180A-180D.

Each TORS 100A-100C and each virtualized server 105A-105N, 115A-115N, 125A, and 125B is further coupled with a management network 175. The management network 175 couples the TORSs and the virtualized servers with management elements. The management elements comprise a cloud execution manager 150, a virtual disk 155, and a cloud network manager 160.

The cloud execution manager ("CEM") 150 schedules VMs for execution, and includes an Object Manager for mapping VMs into and out of the virtual disk 155 which provide permanent storage for each VM's image. A cloud network manager ("CNM") 160 manages the VPNs for the tenants' VPCs.

Figure 2:
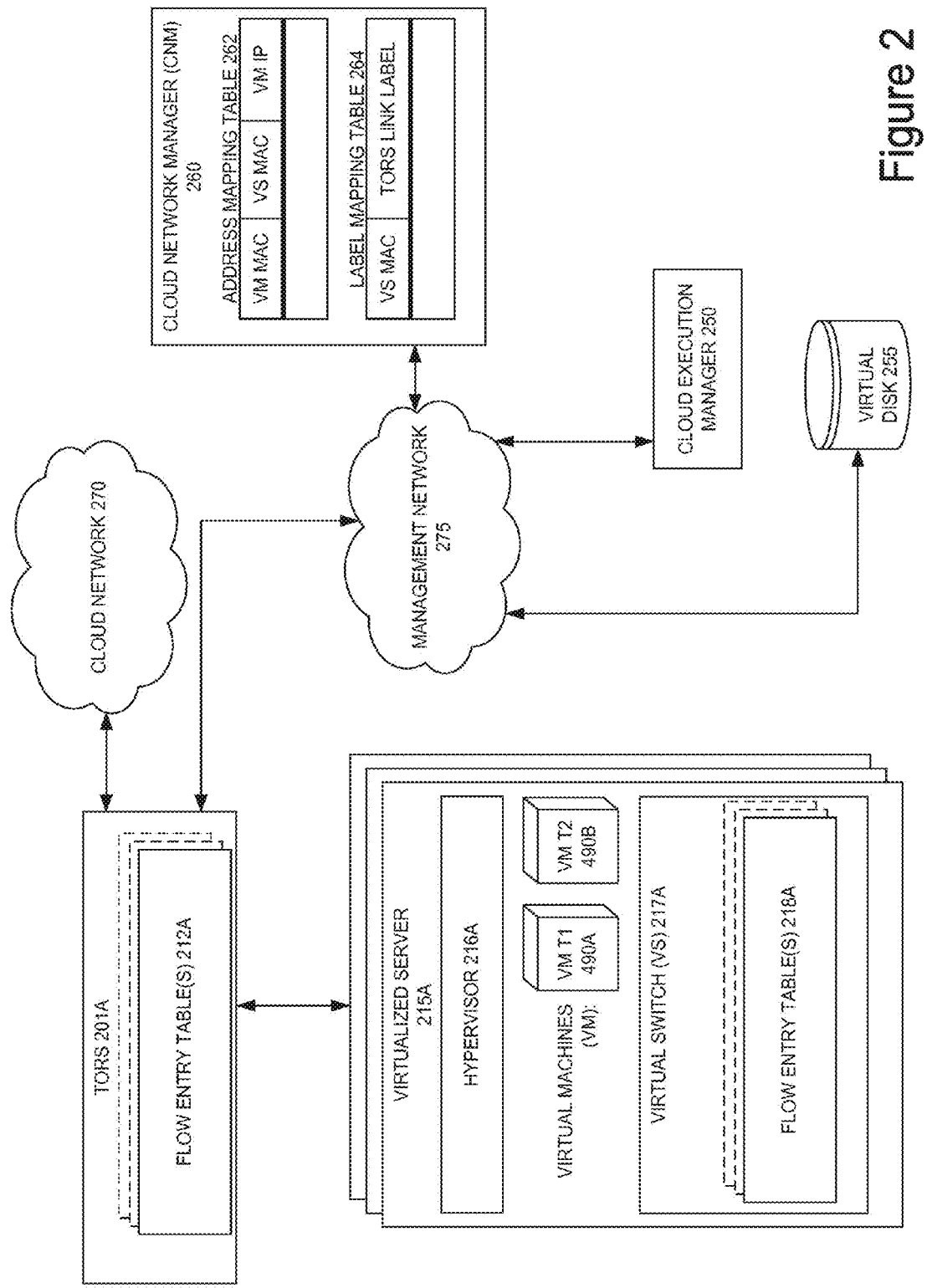
FIG. 2 illustrates components in a cloud computing facility according to one embodiment of the invention.

FIG. 2 illustrates components in a cloud computing facility according to one embodiment of the invention. FIG. 2 shows a TORS 201A that comprises one or more flow entry tables 212A-Z. The flow entry tables 212A-Z are used to match MPLS labels with MPLS actions as described with reference to Open Flow. The TORS 201A is coupled with one or more virtualized servers 215A-N.

Each virtualized server 215A-N is configured to execute one or more VMs. In FIG. 2, the virtualized server 215A comprises a hypervisor 216A which schedules the execution of VMs (e.g., VM T1 and VM T2). The virtualized server 215A further comprises a virtual switch 217A. The virtual switch 217A provides virtual network ports to the VMs executing under the control of the hypervisor. The virtual switch 217A is an MPLS enabled switch that comprises one or more flow entry tables 218A-Z used to match MPLS labels with MPLS actions as described with reference to Open Flow.

The TORS 201A is coupled with a cloud network 270 such as the cloud network described in FIG. 1. The TORS 201A is further coupled with a management network 275. As in FIG. 2, the management network 275 couples the TORSs and the virtualized servers with management elements such as a CEM 250, a virtual disk 255, and a CNM 260. The CNM 260 comprises tables describing the VPN including an address mapping table 262 and a label mapping table 264. The address mapping table 262 maps between the MAC address of a VM, the MAC address of the virtualized server (which is the virtual switch's 217A MAC address) that is running the VM, and the VM's IP address. The label mapping table 264 maps the virtualized server's 215A MAC address (which is the virtual switch's 217A MAC address) to a TORS link label for the link between the virtual switch 217A and TORS 201A. In other embodiments, the CNM 260 keeps track of which Dynamic Host Configuration Protocol ("DHCP") and Domain Name Service ("DNS") (if any) servers belong to which tenant.

In one embodiment, the CNM assumes that tenant VMs are well behaved with respect to how they configure their IP stacks and that they do not arbitrarily change their IP/MAC addresses. If a tenant VM misbehaves and make such a change, its packets will be routed to the CNM and the CNM will inform the CEM. The CEM can then shut down the offending VM.

Figure 3:
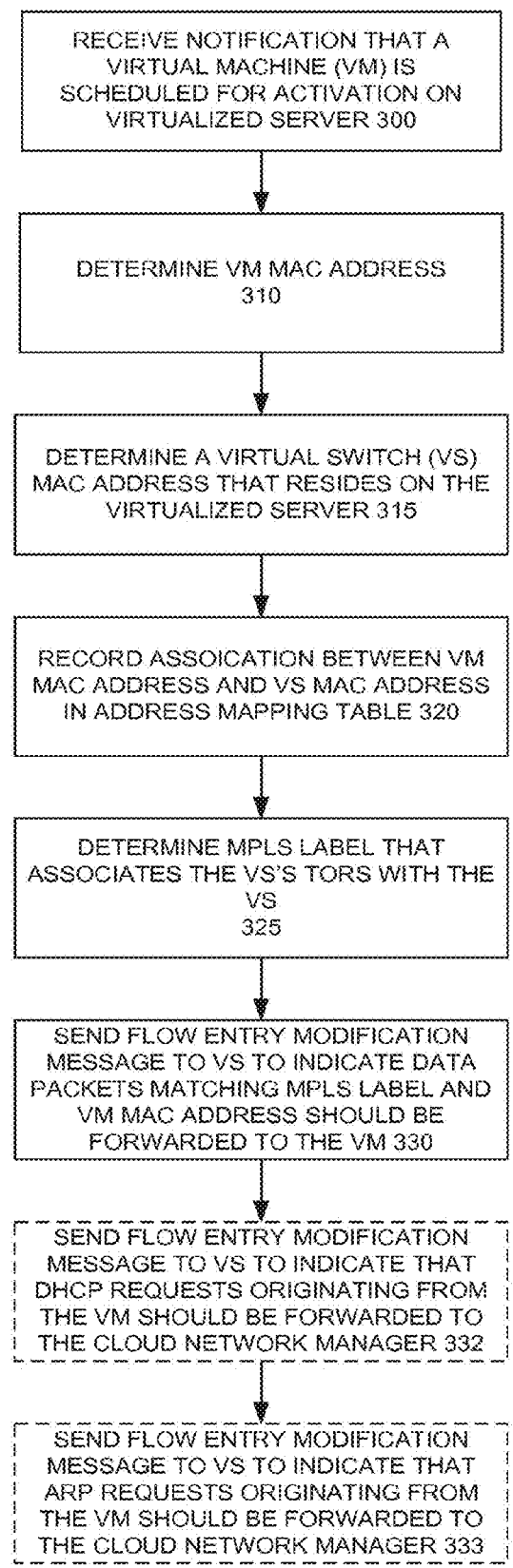
FIG. 3 illustrates a block diagram of a method for activating a virtual machine according to one embodiment of the invention.

FIG. 3 illustrates a block diagram of a method for activating a virtual machine according to one embodiment of the invention. In block 300, a CNM receives notification that a VM is scheduled for activation on a virtualized server. For example, a CEM notifies the CNM that the CEM has schedule the VM for activation. The CNM determines the VM's MAC address and tenant identifier in block 310. In one embodiment, the CEM provides the CNM with the VM's MAC address and tenant identifier along with the notification while in another embodiment the CEM provides the CNM with the VM's MAC address and tenant identifier in a separate message. In block 315, the CNM determines a virtual switch's MAC address corresponding with the virtual switch that resides on the virtual server on which the VM will be activated. In block 320, the CNM records an association between the tenant identifier, the VM's MAC address and the virtual switch's MAC address in the CNM's address mapping table. The CNM further determines, in block 325, an MPLS label that associates the virtual switch with the TORS that is coupled with the virtual switch. In block 330, The CNM 330 sends a flow entry modification message to the virtual switch to indicate that data packets matching the MPLS label, the tenant identifier, and the VM's MAC address should be forwarded to the VM after popping the two MPLS labels. In one embodiment, the CNM sends a flow entry modification message, in block 332, to the virtual switch to indicate that DHCP requests originating from the VM should be forwarded to the CNM. In another embodiment, the CNM sends a flow entry modification message, in block 333, to the virtual switch to indicate that Address Resolution Protocol ("ARP") requests originating from the VM should be forwarded to the CNM.

Figure 4:
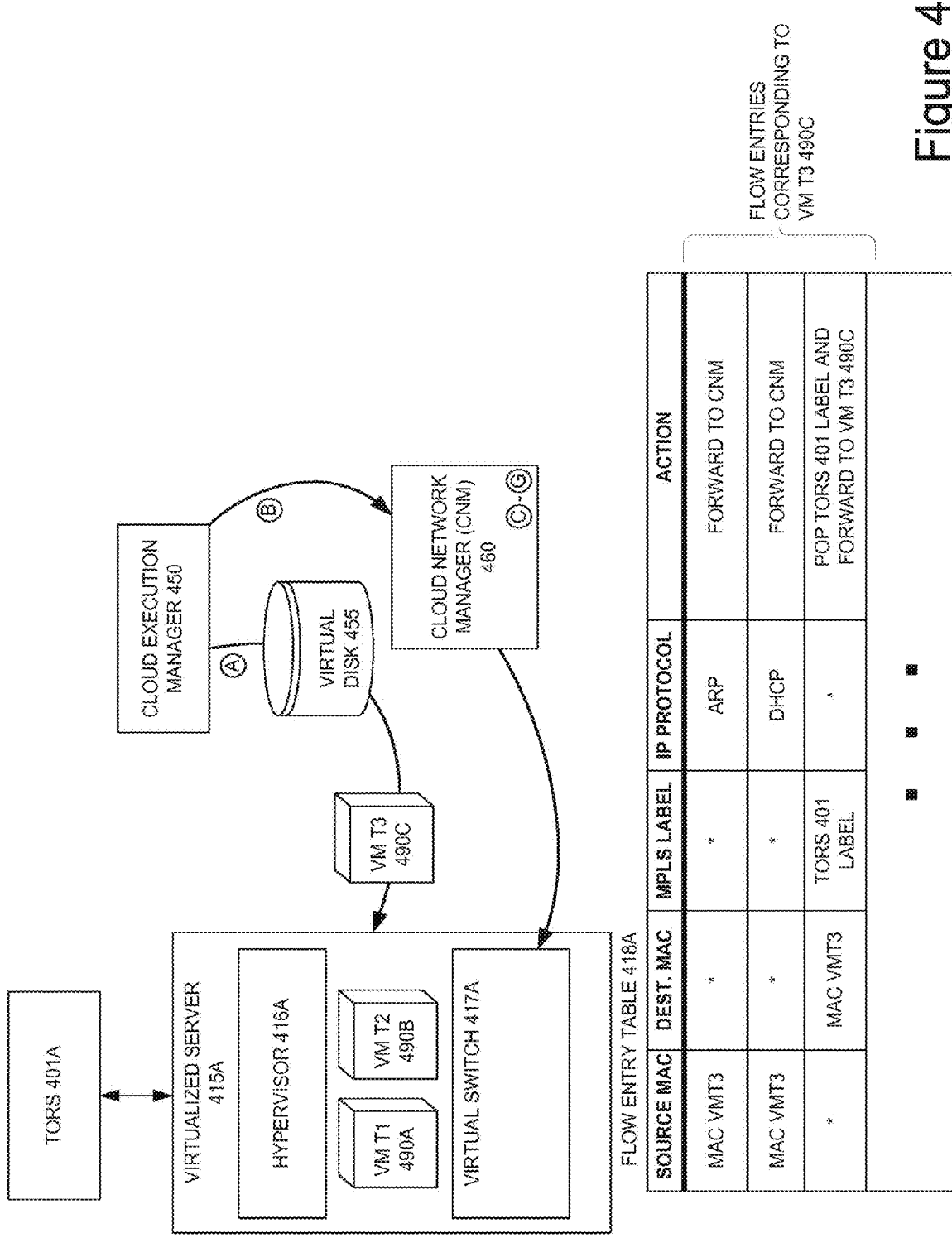
FIG. 4 illustrates a method for activating a virtual machine according to one embodiment of the invention.

FIG. 4 illustrates a method for activating a virtual machine according to one embodiment of the invention. In FIG. 4, a TORS 401A is coupled with a virtualized server 415A. The virtualized server 415A comprises a hypervisor 416A and a virtual switch 417A. In FIG. 4, the virtualized server 415A has two active VMs T1 and T2 490A and 490B. Further, FIG. 4 shows a CEM 450, a virtual disk 455, and a CNM 460.

In FIG. 4, the CEM 450 is scheduling a third VM T3 490C for execution on the virtualized server 415A. This figure illustrates various points during the activation of a virtual machine. At point A, the CEM 450 schedules the VM T3 490C, e.g., a VM belonging to Tenant 3 for execution. The object file is mapped from the virtual disk 455 through the CEM's Object Manager. The CEM edits the VM 490C stack to set the VM's 490C MAC address to one of the MAC addresses assigned to Tenant 3. At point B, The CEM 450 informs the CNM 460 of the activation. It provides the CNM 460 with the MAC address of the VM 490C and the MAC address of the virtualized server 415A on which the VM executes (which is the MAC address of the virtualized server's 415A virtual switch 417A), and the tenant's identifier.

At point C, The CNM 460 records the tenant identifier, the MAC address of the VM 490C in the CNM's address mapping table (not shown) along with the MAC address of the virtualized server 415A on which it has been scheduled. At point D, The CNM 460 looks up the virtual switch to TORS 401A MPLS label for the link between the virtualized server 415A on which the VM 490C is running and the TORS 401A (this is also known as the source TORS "STORS" link label) and the tenant label from the CNM 460 label mapping table. At point E, the CNM 460 sends a flow entry modification message to the MPLS enabled virtual switch 217A to install a rule that matches the tenant label, the VM's 490C MAC and the STORS link label with an action to pop the STORS link label and the tenant label, and forwards the packet to the VM 490C.

In one embodiment, the CNM 460 sends a second flow entry modification message, at point F, to the virtual switch 217A to install the following rule. If the source MAC matches the MAC address for VM 490C and the protocol is ARP, route the packet to the CNM 460 to allow the CNM 460 to service the ARP request. This rule reduces the ARP traffic and allows the CNM 460 to answer from the CNM address mapping table.

In another embodiment, the CNM 460 sends a third flow entry modification message, at point G, to the virtual switch 217A to install the following rule. If the source MAC matches the MAC address for VM 490C and the protocol is DHCP, route the packet to the CNM 460 to allow the CNM 460 to service the DHCP request. This rule allows the CNM 460 to record a MAC address to IP address mapping in the CNM address mapping table by intercepting the reply packet from a DHCP server. If the tenant use DHCP to obtain an IP address, this step is required.

FIG. 4 illustrates three entries in a flow entry table 418A of the virtual switch 417A assuming that all three previously described flow entry modification messages were communicated. The flow entry table 418A has five columns illustrated: a source MAC, destination MAC, MPLS label, IP protocol, and action. The flow entries correspond to the activation of 490C.

The first entry in flow entry table 418A illustrated matches the MAC address of VM T3 490C as a source MAC address. The destination MAC address and MPLS label are set to match any entry while the IP protocol is set to match on the ARP protocol. The action is then to forward to CNM 460. This rule corresponds with step F described above.

The second entry in flow entry table 418A illustrated matches the MAC address of VM T3 490C as a source MAC address. The destination MAC address and MPLS label are set to match any entry while the IP protocol is set to match on the DHCP protocol. The action is then to forward to CNM 460. This rule corresponds with step G described above.

The third entry in flow entry table 418A illustrated matches all MAC addressed as a destination MAC address. The destination MAC address is set to match the MAC address of VM T3 490C while one MPLS label is set to the VS-TORS 401 link label, and the other is set to the tenant label. The IP protocol is set to match on all entries. The action is then to pop the MPLS label and forward the packet to VM T3 490C. This rule corresponds with step E described above.

As described above, a CNM maintains a mapping between a VM MAC address, virtualized server MAC, and VM IP address. If a tenant has elected not to use DHCP addresses, then the CEM modifies the VM's IP stack prior to execution scheduling and installs a static IP address. However, in other embodiments a tenant will elect to use DHCP addresses. In such a case, the CNM will intercept DHCP requests and act as a relay in accordance with "DHCP Relay Agent Information Option," IETF, RFC 3046, January 2001.

Figure 5:
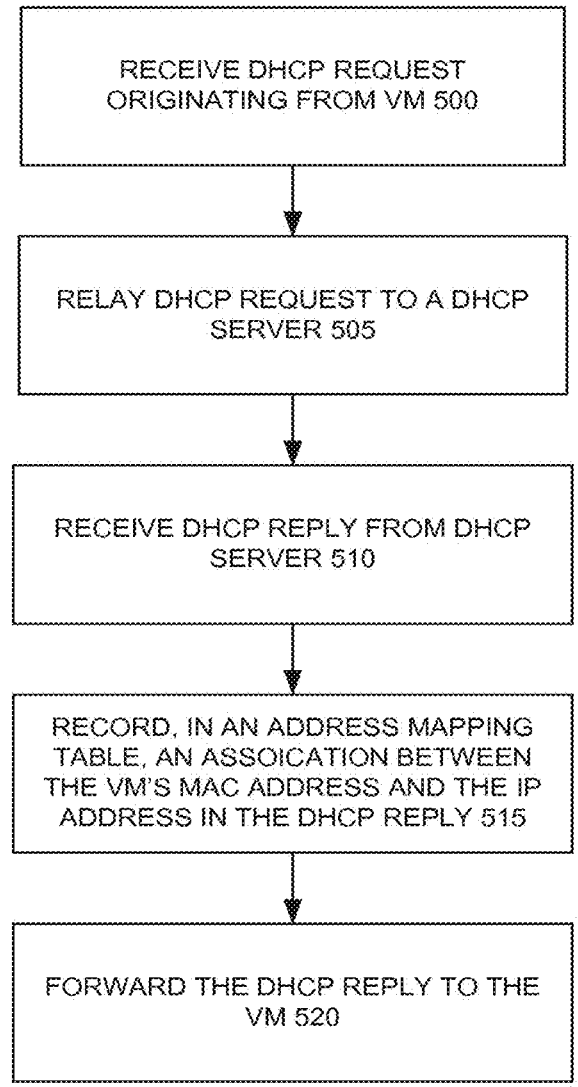
FIG. 5 illustrates a block diagram of a method for intercepting DHCP requests from a VM according to one embodiment of the invention.

FIG. 5 illustrates a block diagram of a method for intercepting DHCP requests from a VM according to one embodiment of the invention. At block 500, the CNM receives the DHCP request that originated from a VM. The CNM relays the DHCP request to a DHCP server in accordance with RFC 3046 at block 505. At block 510, the CNM receives a DHCP reply from the DHCP server. At block 515, the CNM records an association in an address mapping table between the VM's MAC address and the IP address received in the DHCP reply. In accordance with embodiments of the invention, the association further includes the MAC address of the virtual server executing the VM. At block 520, the CNM forwards the DHCP reply to the VM.

Figure 6:
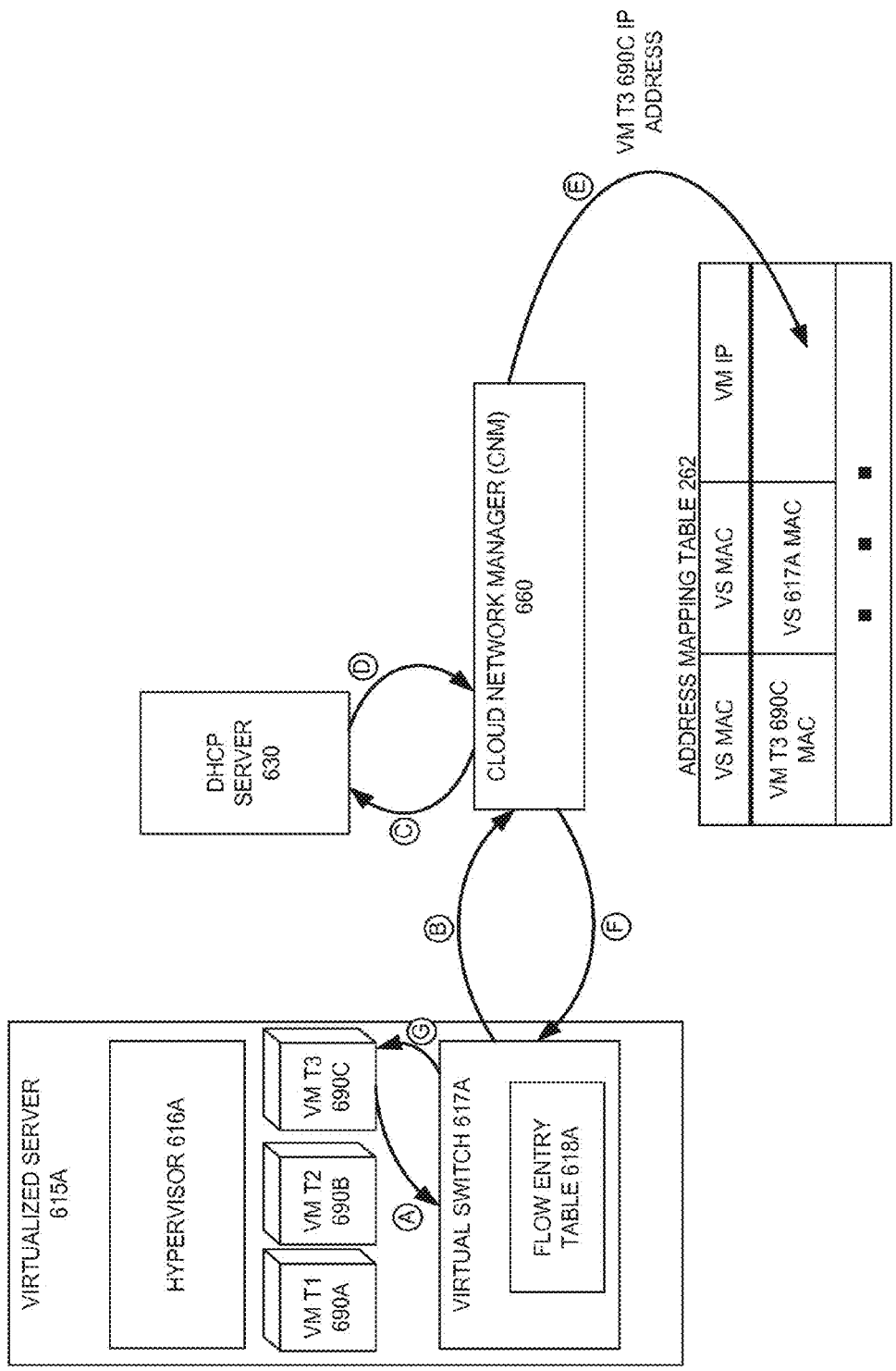
FIG. 6 illustrates a method for intercepting DHCP requests from a virtual machine according to one embodiment of the invention.

FIG. 6 illustrates a method for intercepting DHCP requests from a virtual machine according to one embodiment of the invention. In FIG. 6, a virtualized server 615A comprises a hypervisor 616A and a virtual switch 617A. In FIG. 6, the virtualized server 615A has three active VMs T1, T2, and T3 690A-690C. The virtual switch 617A comprises a flow entry table 618A that includes a rule to forward DHCP requests from VM T3 690C to a CNM 660 which is coupled with a DHCP server 630.

This figure illustrates various points during the interception of a DHCP request from a virtual machine. At point A, the VM T3 690C issues a DHCP Request to obtain an IP address and other configuration information, such as the DNS server. At point B, the virtual switch 617A matches the request with a flow rule to route the DHCP request to the CNM 660. At point C, the CNM 660 acts as a DHCP relay, inserts a standard DHCP Relay Option, and forwards the request to the tenant's DHCP server 630. The CNM 660 can determine which tenant the VM T3 690C belongs to by examining the source MAC address of the DHCP request. At point D, The tenant's DHCP server 630 responds with a DHCP Reply containing an IP address for the VM T3 690C and other configuration information. At point E, the CNM 660 records the mapping between the VM T3 690C MAC address and the IP address in the CNM's address mapping table 262. At point F, the CNM 660 strips off the DHCP Relay Option and forwards the DHCP reply to the virtual switch 617A which forward the request back to VM T3 690C at point G.

In the typical IP LAN scenario, a source application running in a server wishing to communicate with a destination application uses DNS to discover the IP address of the destination application. After the IP address is found, the IP stack in the source server broadcasts an ARP message to discover a mapping between the IP address and the MAC address of the destination. If the destination is on the local LAN, it replies to the ARP. If the destination is not running on the local LAN, the source server IP stack uses the MAC address of a local router as a gateway to other subnets.

In the cloud, VMs run on top of a virtualized LAN. The tenant runs its own DNS server, or buys DNS service from the cloud operator. A VM is configured with the address of the DNS server it is to use. When the tenant wants to contact a service, it sends a DNS request to the DNS server to discover the IP address, exactly as in a normal corporate LAN. The DNS server can be under control of the cloud operator or it can be controlled by the individual tenant. When the DNS reply returns, the VM broadcasts an ARP request to determine the IP to MAC address mapping.

In embodiments of the invention, a virtual switch intercepts the ARP message and relays it to a CNM rather than broadcasting it. The CNM provides an address mapping service so that the ARP messages do not need to be broadcast throughout the cloud network.

Figure 7:
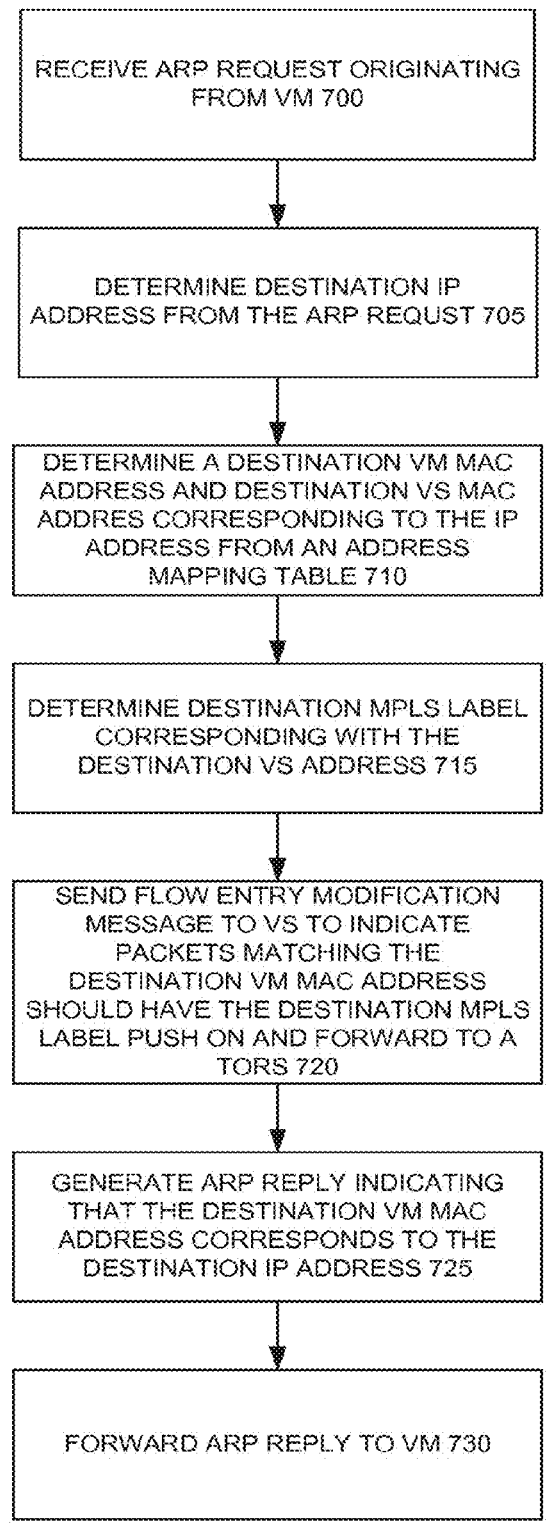
FIG. 7 illustrates a block diagram of a method for intercepting ARP requests from a VM according to one embodiment of the invention.

FIG. 7 illustrates a block diagram of a method for intercepting ARP requests from a VM according to one embodiment of the invention. At block 700, a CNM receives an ARP request that originated from a VM. The CNM determines the destination IP address from the ARP request at block 705. At block 710, the CNM determines a destination VM MAC address and destination virtual switch MAC address corresponding to the IP address. For example, the CNM can look up the mapping from the CNM's address mapping table based on the IP address within the ARP request. At block 715, the CNM determines a destination MPLS label that corresponds with the destination virtual switches MAC address. At block 720, the CNM sends a flow entry modification message to the virtual switch on the virtual server that is executing the source VM. The entry modification message indicates that packets matching the source VM MAC address and the destination VM IP address should first have the tenant id label pushed on, and second have the destination MPLS label pushed on and get forwarded to a TORS for the source virtual switch. At block 725, the CNM generates an ARP reply indicating the destination VM MAC address corresponds to the destination IP address. The CNM forwards the ARP reply to the source VM in block 730. Note that the CNM installs the exact same rule in the destination VS, with the destination VM's MAC address and source VM's IP address, since the destination VM is the source of the packet.

Figure 8:
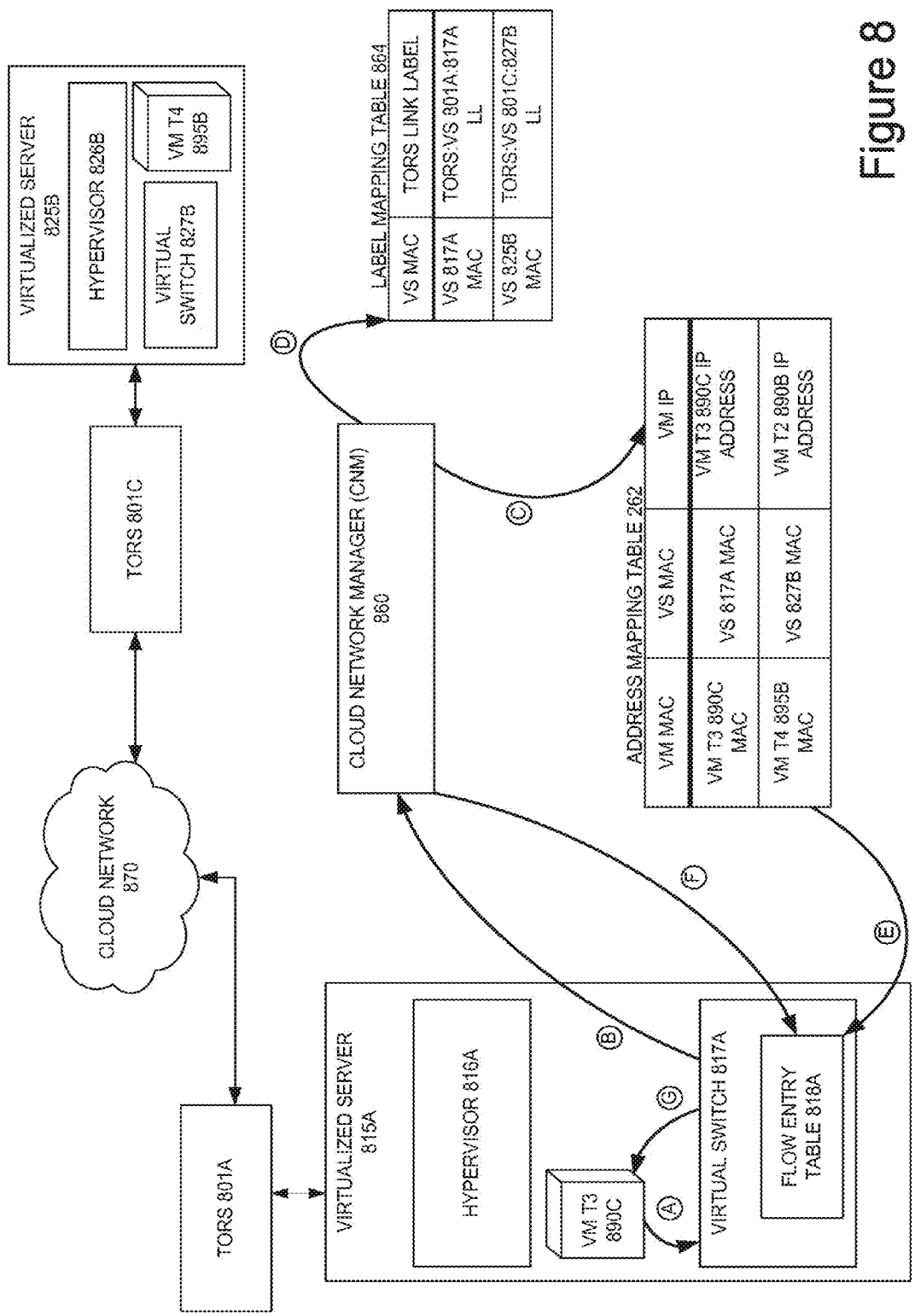
FIG. 8 illustrates a method for intercepting ARP requests from a virtual machine according to one embodiment of the invention.

FIG. 8 illustrates a method for intercepting ARP requests from a virtual machine according to one embodiment of the invention. In FIG. 8, a virtualized server 815A comprises a hypervisor 816A and a virtual switch 817A. In FIG. 8, the virtualized server 815A has an active VM T3 890C. The virtual switch 817A comprises a flow entry table 818A that includes a rule to forward ARP requests from VM T3 890C to a CNM 860. The virtualized server 816A is coupled with a TORS 801 that is coupled to another TORS 801C through a cloud network 870. The TORS 801C is coupled with a virtualized server 825B that comprises a hypervisor 826B and virtual switch 827B. The virtualized server 825B is executing VM T4 895B.

This figure illustrates various points during the interception of an ARP request from a VM T3 890C. At point A, the VM T3 890C broadcasts an ARP request. The rest of the interception assumes that the ARP request indicates the IP address of a destination VM T4 895B that resides on the virtual server 825B. The virtual switch 817A intercepts the ARP request and matches the request to a rule in the flow entry table 818A that routes the ARP request to the CNM 860 at point B.

At point C, the CNM 860 uses the requested destination IP address ("DIP") as a key to look up a destination MAC address ("DMAC") in the CNM's address mapping table 262. If the DIP is not present, the destination is not within the cloud and the CNM does not reply to the ARP request. The VM will then use the MAC address of the local router provided. If the DIP address is present in the CNM's address mapping table 862, then the CNM 860 retrieves the DMAC VM address and the DMAC virtualized server address. In this case, the CNM will retrieve VM T4's 895B MAC as the DMAC VM address and virtual switch 827B MAC as the DMAC virtualized server address.

At point D, the CNM looks up the MPLS flow label for the link between the destination TORS and the DMAC virtualized server address from the CNM's label mapping table 864, also known as a destination TORS ("DTORS") link label. This flow label describes the route between the TORS 801A and the virtualized server at the DMAC virtualized server. In this case, the label TORS:VS 801C:827B LL will be retrieved to indicate a route to the TORS 801C from TORS 801A.

At point E, the CNM 860 installs a flow route in the virtual switch's 817A flow entry table 818A. The rule matches the DMAC VM address for VM T4 895B. The action pushes the tenant id label, then the DTORS link label TORS:VS 801C:827B LL onto traffic packets sent by VM T3 890C to VM T4 895B, then forwards the packet to the TORS 801A. At point F, the CNM 860 returns the ARP reply to the virtual switch 817A which forward the reply to VM T3 890C.

In one embodiment, the CNM 860 installs the VS-TORS rules and actions into the TORS's 801 flow entry table (not shown) prior to returning an ARP reply to the VM. If the cloud network 870 is an MPLS network, rules for LSPs between the TORS within the cloud network 870 switch fabric do not need to be installed when the ARP reply is returned. If the cloud network 870 switches additionally support Open Flow, the CNM 860 need only install MPLS forwarding rules into the higher level cloud network 870 switches using OpenFlow at the time a new TORS is installed or an existing TORS is decommissioned. These rules recognize the TORS-VS labels on the links to the servers in the same rack as the TORS and forward the packets to the server whose link is identified by the label. These rules are installed into OpenFlow Table 2 at the time the rack is booted up. If, however, the higher level data center switches do not support OpenFlow, the TORS instead use label distribution protocol (LDP) to set up LSPs between itself and the other TORS, and the LSPs should be configured. The cloud network 870 switches do not need to support IP routing protocols nor do they need to perform routing.

Table 1 illustrates the rule structure of an OpenFlow flow table of a TORS, for the portion of the flow table that deals with traffic being routed to a destination TORS, i.e. outgoing traffic and traffic with destination servers in the current rack according to embodiments of the invention. The rule structure for incoming traffic is further explained later. There is a flow rule in the table for each DTORS (destination TORS)-DVS (destination virtualized server) link label currently in use as a destination by a source VM in the rack. The TORS may additionally cache some flow rules to catch incoming traffic when a VM moves. Traffic coming from the source VMs in rack is routed by matching the MPLS DTORS link label that was pushed by the virtual switch, and actions associated with the rule are activated and applied to the packet. Actions differ depending on the nature of the cloud network.

TABLE 1

| Link Label | Other Fields | Action |
| --- | --- | --- |
| TORS:VS 801C:827B LL | ... | Cloud Network Specific Action |
| TORS:VS 801A:817A LL | ... | Cloud Network Specific Action |

If the cloud network is not an MPLS network, the TORS adapts traffic to the cloud network through OpenFlow virtual ports. A virtual port associated with the actions on flow matching rules processes packets and adds any headers necessary to route the packet into the cloud network. For example, if the network is an optical circuit-switched network, the virtual port may route it through an optical cross connect. One of skill in the art would understand that other types of cloud networks would utilize other adaptation virtual ports.

If, however, the cloud network is an MPLS network then exemplary actions are shown in Table 2 (which corresponds to OpenFlow Table 1). Each action pushes a STORS to DTORS routing label, then sends the packet to an OpenFlow SELECT group. The SELECT group uses Equal Cost Multicast (ECMP) or some other load balancing algorithm to select one output port bucket from the output ports bucket list and forwards the packet to the output port. Load balancing helps avoid congestion and facilitates multi-path utilization of all routes between the two TORS.

TABLE 2

| Link Label | Other Fields | Action |
| --- | --- | --- |
| TORS:VS 801C:827B LL | ... | Push S->D Label; Route Label |
| TORS:VS 801A:817A LL | ... | Push S->D Label; Route Label |

Once the packet reaches the destination TORS, it is routed through the OpenFlow flow tables such as shown in Tables 3 (which corresponds to OpenFlow Table 1) and 4 (which corresponds to OpenFlow Table 2). Assuming the packet has a label of "LABEL-N" at the destination TORS, the rules match the DTORS routing label "LABEL-N" indicating that the packet is destined for this TORS. The action pops the DTORS routing label and sends the packet to Table 4 for processing. The Table 4 rule matches the VS-TORS label for servers in the rack, indicating to which virtualized server the packet is destined. The action forwards the packet out the appropriate port for reaching that virtualized server.

TABLE 3

| Link Label | Other Fields | Action |
| --- | --- | --- |
| LABEL-N | ... | Pop S->D Label; Send to OpenFlow Table 2 |
| LABEL-X | ... | Push S->D Label; Sent to OpenFlow Table 2 |

TABLE 4

| Link Label | Other Fields | Action |
| --- | --- | --- |
| TORS:VS 801C:827B LL | ... | Route Packet to Virtual Switch 827B |
| TORS:VS 801A:817A LL | ... | Route Packet to Virtual Switch 817A |

At the virtual switch 827B, the rule that matches the VM T4's 827B MAC address and, the tenant label, the VS-TORS routing label is triggered. The VS-TORS routing label and tenant label are popped and the packet is forwarded to the VM T4 827B.

One of the most difficult aspects of cloud networking is dealing with the movement of a VM from a first virtualized server to a second virtualized server. The CEM can, at any time, move a VM from one server to another. The movement may be made to optimize server utilization, reduce power consumption or heat generation, or to position the VM closer access to an external resource, such as a database. When such a movement occurs, the routes to the VM at the old server are no longer valid. Packets "in flight" while the VM is moved can be dropped and new packets may not reach the VM's new location, unless measures are taken to fix up the routes.

Figure 9:
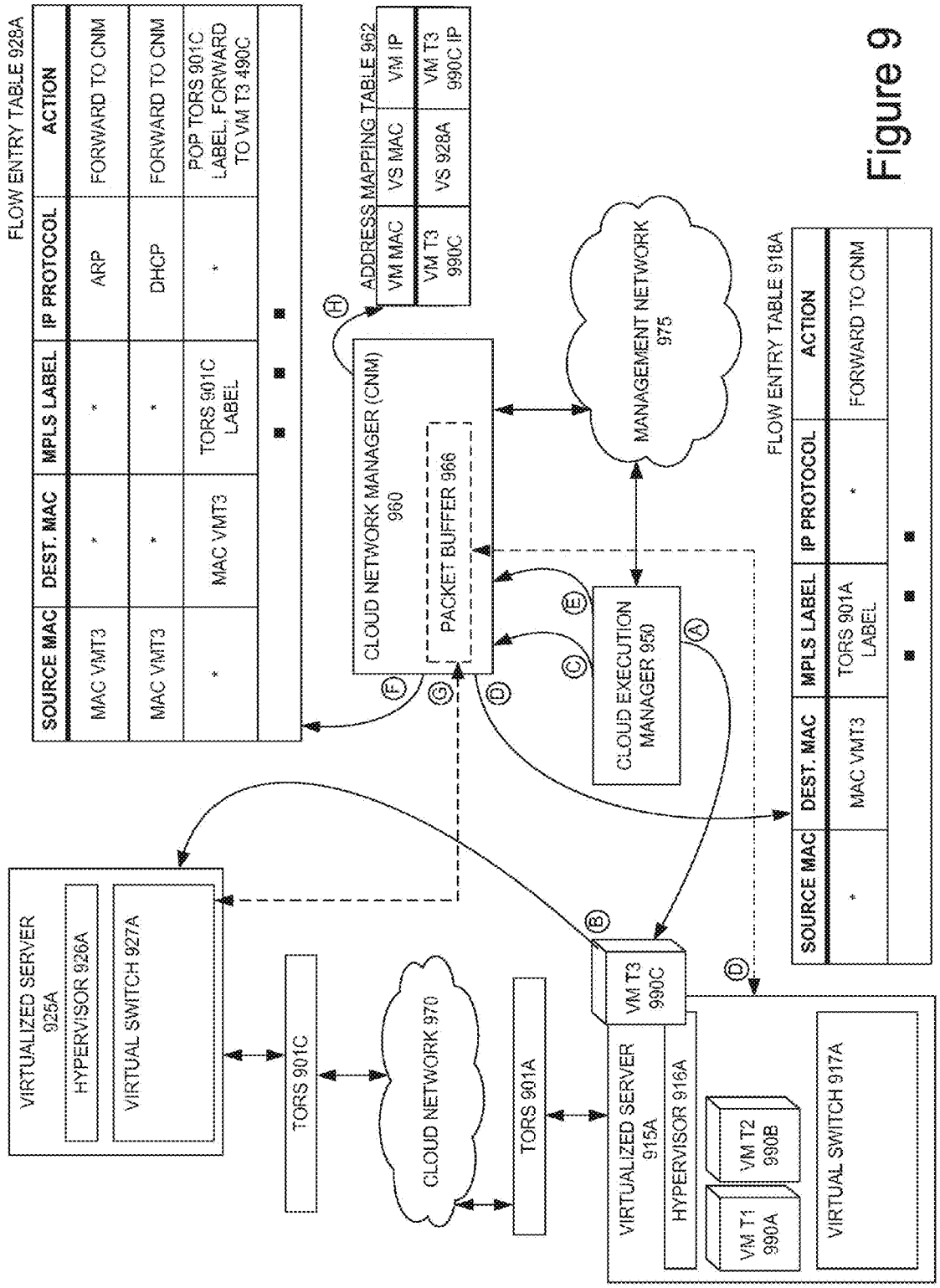
FIG. 9 illustrates a method of moving a VM from a first virtualized server to a second virtualized server in cloud computing network.

FIG. 9 illustrates a method of moving a VM from a first virtualized server to a second virtualized server in cloud computing network. In FIG. 9 a first virtualized server 915A (also referred to as the old virtualized server) is coupled with a TORS 901A that is coupled to a cloud network 970. The cloud network 970 couples the TORS 901A with another TORS 901C which is coupled to a second virtualized server 925A (also referred to as the new virtualized server). Each virtualized server 915A and 925A are configured to run a plurality of VMs and comprise a corresponding hypervisor 916A and 926A and an MPLS enabled virtual switch 917A and 927A. Each virtual switch 917A and 927A comprises a flow entry table 918A and 928A that includes MPLS rules to indicate how the corresponding virtual switch should process packets it receives. The specific entries used for the movement of a VM will be discussed in detail below. Prior to the illustration of FIG. 9, the old virtualized server 915A has three active VMs: VM T1 990A, VM T2 990B, and VM T3 990C. FIG. 9 further illustrates a CEM 950 coupled with a CNM 960 through a management network 975. The management network further couples the CEM 950 and CNM 960 with the TORSs 915A and 925A thereby providing communication paths to the virtualized servers 915A and 925A.

This figure illustrates various points during the movement of the VM T3 990C from the old virtualized server 915A to the new virtualized server 925A. The terms old virtualized server and new virtualized serer are reflective of the fact that prior to the movement VM T3 990C was active at the old virtualized server and after the movement VM T3 990C will be active at the new virtualized server 925A.

At point A, the CEM 950 begins moving VM T3 990C from the old virtualized server 915A to the new virtualized server 925A. Point A indicates a message being transmitted from the CEM 950 to the old virtualized server 915A indicating that a move of 9 T3 990C is being initiated. As long as VM T3 990C is active on the old virtualized server 915A then VM T3 990C can continue servicing traffic and the old flow rules are maintained in the flow entry table 918A. The hypervisor 916A prepares VM T3 990C for transfer to the new virtualized server 925A by saving the VM T3's 990C state information and directing the VM T3 990C to enter a standby or inactive state. At point B, the VM T3's 990C state information is transferred from the old virtualized server 915A to the new virtualized server 925A.

At some point, point C, during the deactivation of VM T3 990C, the CEM 950 decides that VM T3 990C can no longer service traffic. At this time, the CEM 950 notifies the CNM 960 that VM T3 990C cannot service traffic at this time because VM T3 990C is being moved. In reaction to this message, the CNM 960 modifies rules in the virtual switch's 917A flow entry table 918A. Thus, at point D, the CNM 960 installs a rule in the flow entry table 918A indicating that traffic matching VM T3's 990C MAC address as the destination MAC with a MPLS label linking the virtualized server 915A with the TORS 901A should be forwarded to the CNM 960 (or to some other entity). The CNM 960, or optionally some other entity, will provide intelligence with how to deal with traffic directed to the old virtualized server 915A meant for VM T3 990C.

In one embodiment, the CNM 960, or some other entity designed for this purpose, comprises a packet buffer 966 used to store packets meant for VM T3 990C during the transition period. In this way, packets in the packet buffer 966 meant for VM T3 990 can be sent to VM T3 990 once it is active at the new virtualized server 925A.

In one embodiment, when VM T3 990 is ready to service data at the new virtualized server 925A, the CEM 950 notifies CNM 960 that VM T3 990 is active again at point E. In another embodiment, the CNM 960 can detect that the VM T3 990 is active because the CNM 960 has received a packet (such as an ARP request) that originated from the VM T3 990 after it was reactivated. The CNM 960 reacts to the VM T3 990 being ready to service data by modifying the flow entry table 928A.

At point F, the CNM 960 adds one or more entries to flow entry table 928A. The CNM 960 adds a flow rule to the flow entry table 928A that matches VM T3's 990C MAC address as the destination MAC along with matching an MPLS label linking the virtualized server 925A with the TORS 901C and the tenant id label. This rule informs the virtual switch 927A that matching packets should have both MPLS labels popped off and be forwarded to VM T3 990C. Other embodiments of the invention support additional rules. For example, one embodiment adds a rule indicating that DHCP packets originating from VM T3 990C should be forward to CNM 960 if the tenant uses DHCP to obtain its IP address. Another embodiment adds a rule indicating that ARP request originating from VM T3 990C should be forward to CNM 960.

At point G, the CNM 960 (or some other entity designed to buffer packets during the transition of VM from an old virtualized server to a new virtualized server) forwards accumulated packets destined for VM T3 990C to the virtualized server 925A so those packets may be delivered to VM T3 990C.

At point H, the CNM 960 modifies the CNM's 960 address mapping table 962 table to change the virtualized server MAC address entry for VM T3 990C to the destination new virtualized server's 925A MAC address. After these changes, any new ARP requests for VM T3's 990C in accordance with FIG. 7 will result in flow entry at the source virtual switch indicated traffic should be routed to 925A.

In one embodiment, the CNM 960 keeps the flow rule in place on the old virtualized server's 915A virtual switch 917A for any peer VMs that may still be exchanging traffic with VM T3 990C as those peer VMs may still expect VM T3 990C to be active on the old virtualized server 915A. If such a peer VM should send a peer data packet to VM T3 990C, it will be forwarded to the CNM 960 according to the rule installed at point D. The CNM 960 then modifies a flow rule on the peer VM'S virtualized server to forward traffic to VM T3 990C on the new virtualized server 925A using the MAC and IP address on the packet to locate the VM T3 990C. The CNM 960 forwards the peer data packet along to VM T3 990C on the new virtualized server 925A. In this way, all flow rules ultimately either time out or are modified to send traffic to VM T3 990C on the new virtualized server 925A. In one embodiment, the TORS flow table may also require changes to remove the old TORS-VS link label and install the TORS-VS link label to the new VS. The CNM can allow the source virtual switch flow rules and TORS rules to time out after a predetermined grace period.

Figure 10:
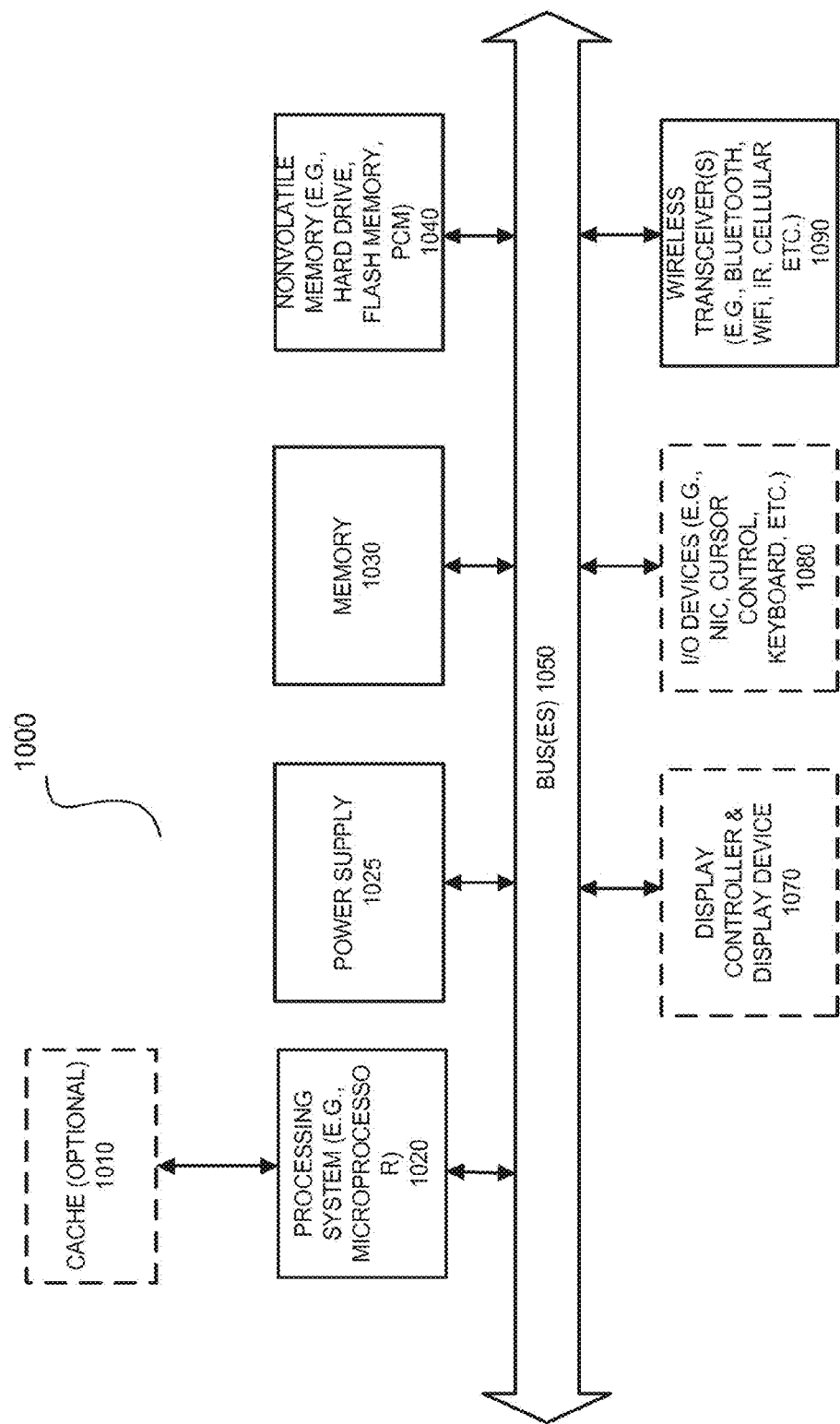
FIG. 10 illustrates a block diagram of an exemplary computer system according to embodiments of the invention.

FIG. 10 illustrates a block diagram of an exemplary computer system according to embodiments of the invention. The exemplary computer system 1000 in FIG. 10 can be used to implement the TORS, the virtualized server, the CEM, or the CNM as described in FIGS. 1-9 and 11-22. Those skilled in the art would recognize that other computer systems used to implement these devices may have more or less components and may be used to in embodiments of the invention.

The computer system 1000 includes a bus(es) 1050 which is coupled with a processing system 1015, a power supply 1020, volatile memory 1025 (e.g., double data rate random access memory (DDR-RAM), single data rate (SDR) RAM), nonvolatile memory 1030 (e.g., hard drive, flash memory, Phase-Change Memory (PCM). The processing system 1015 may be further coupled to a processing system cache 1010. The processing system 1015 may retrieve instruction(s) from the volatile memory 1025 and/or the nonvolatile memory 1030, and execute the instruction to perform operations described above. The bus(es) 1050 couples the above components together and further couples a display controller 1070, one or more input/output devices 1080 (e.g., a network interface card, a cursor control (e.g., a mouse, trackball, touchscreen, touchpad, etc.), a keyboard, etc.), and, optionally, one or more wireless transceivers (e.g., Bluetooth, WiFi, Infrared, etc.). In one embodiment, the display controller 1070 is further coupled to a display device 1075.

In a further embodiment, the CNM has additional databases that it uses to maintain the mapping between tenant ids, TORS labels, and the MAC and IP addresses of VMs and servers. It uses these databases to generate tenant specific labels that are added to the packets sent between tenant VM's. These database accesses are performed prior to installing or uninstalling flows on Openflow switches.

Figure 11:
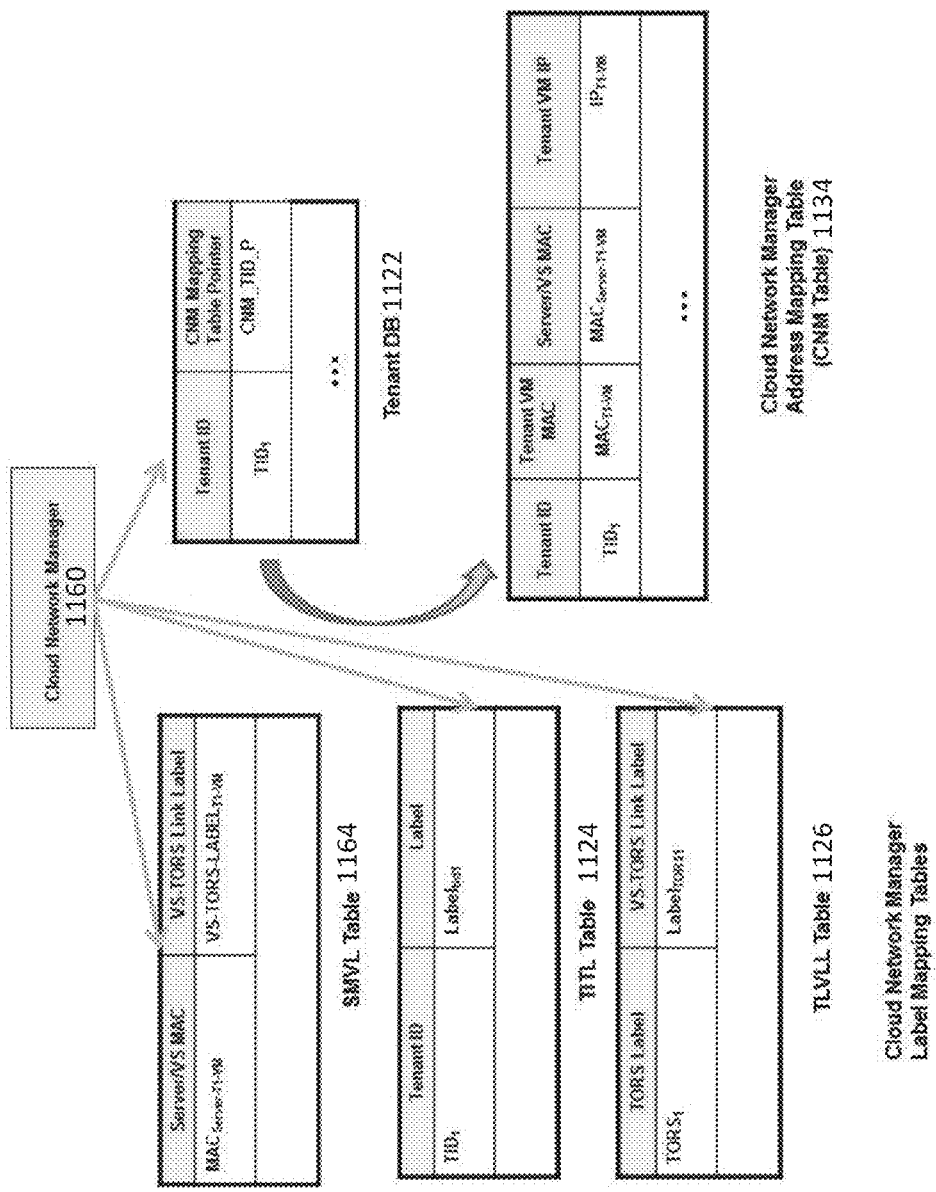
FIG. 11 shows the addition of the tenant ID to the CNM.

FIG. 11 illustrates the additional databases maintained by the CNM. The CNM uses the Tenant ID to Tenant Label (TITL table) to look up the tenant label using the tenant ID as a key. The CNM uses the TORS Label to VS Link Label table (TLVLL table) to look up the VS link label using the TORS label as the key. The CNM uses the CNM mapping table (CNM Table) to maintain the mapping between the tenant id, tenant VM MAC and IP address, and the server MAC address. There is one CNM mapping table per tenant.

The tenant ID isolates tenant specific data, keeping it separate from other tenants using the same cloud infrastructure. To achieve this isolation, a tenant label is added as a forwarding entry. The use of a tenant label having the tenant ID segregates and isolates tenant specific traffic to their respective VM's. Nevertheless, in this further embodiment, the VM's that belong to different tenants can have same network (IP/MAC) addresses.

As seen in FIG. 11, the tenant database is used to add tenant ID information to the CNM address mapping table. The tenant database, which is used to store details specific to a tenant, is keyed to a tenant ID. The tenant database keeps pointers to the CNM address mapping table. In this embodiment, the CNM first performs a lookup to the tenant database to find the tenant specific address mapping table before performing all other CNM address mapping table lookups. Once it has found a tenant's specific address mapping table it goes through the additional steps hereinabove described.

Figure 12:
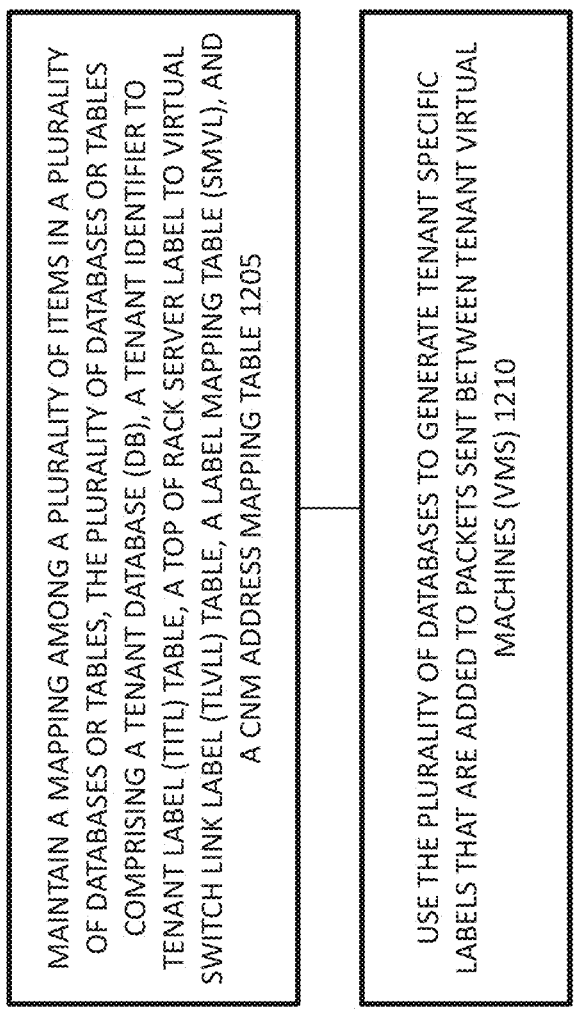
FIG. 12 illustrates a method for isolating tenant specific data using a CNM.

FIG. 12 illustrates a method for isolating tenant specific data using a cloud network manager (CNM). At block 1205, the CNM maintains a mapping among a plurality of items in a plurality of databases or tables. The plurality of databases or tables include a tenant database (DB), a tenant identifier to tenant label (TITL) table, a top of rack server label to virtual switch link label (TLVLL) table, a label mapping table (SMVL), and a CNM address mapping table. At block 1210, the CNM uses the plurality of databases to generate tenant specific labels that are added to packets sent between tenant virtual machines (VMs). In one embodiment, database accesses are performed prior to installing or uninstalling flows on Openflow switches.

The CNM uses the TITL table to look up the tenant label using a tenant ID as a key. The CNM uses the TLVLL table to look up the virtual switch (VS) link label using the top of rack server (TORS) label as the key.

The CNM uses the CNM address mapping table to maintain a mapping among a tenant ID, a tenant VM media access control (MAC) address, a tenant VM Internet Protocol (IP) address, and a server MAC address. There is one CNM address mapping table per tenant.

Tenant specific data is isolated by adding a tenant label as a forwarding entry. Using the tenant label that has a tenant ID segregates and isolates tenant specific traffic to a respective VM. In one embodiment, VMs that belong to different tenants have the same internet protocol and media access control addresses.

The tenant DB keeps pointers to the CNM address mapping table. The CNM first performs a lookup to the tenant DB to find a tenant specific address mapping table before performing all other CNM address mapping table lookups.

Figure 13:
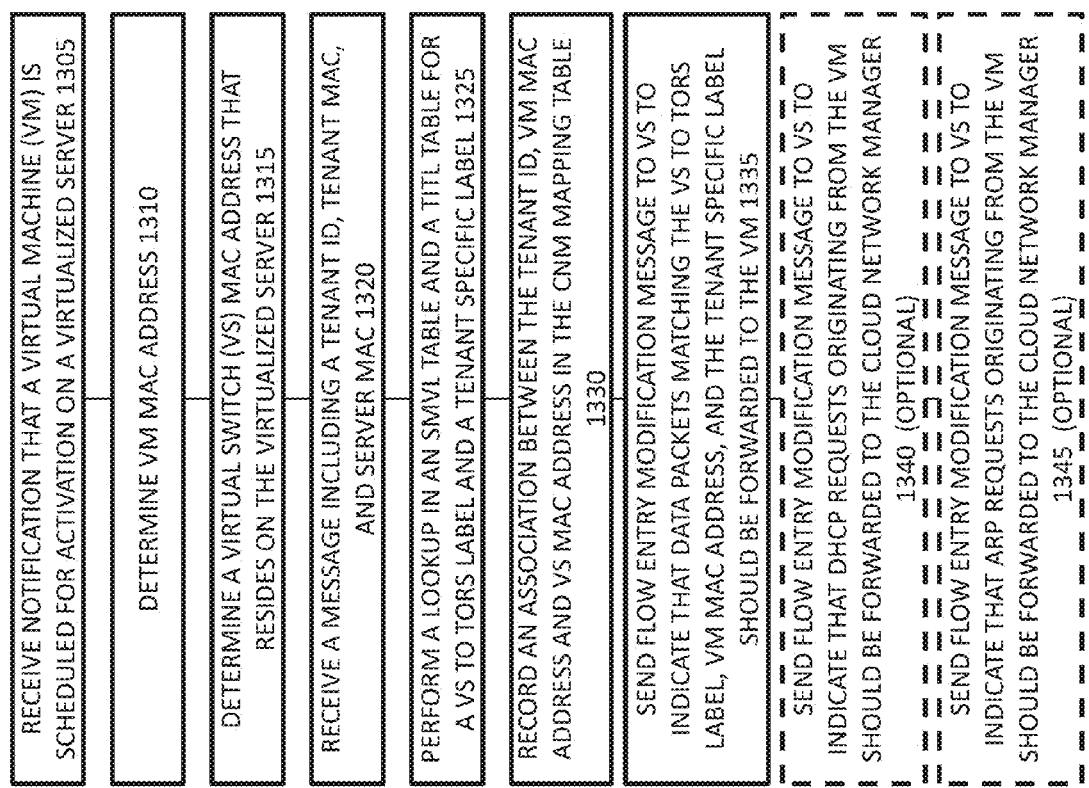
FIG. 13 illustrates a block diagram of a method for activating a virtual machine on a per tenant basis according to one embodiment.

FIG. 13 illustrates a block diagram of a method for activating a virtual machine on a per tenant basis. In block 1305 a notification that a VM is scheduled for activation on a virtualized server is received by the CNM. For example, a CEM notifies the CNM that the CEM has scheduled the VM for activation. In block 1310, the CNM determines the VM MAC address. In block 1315, the CNM determines a virtual switch's MAC address corresponding with the virtual switch (VS) that resides on the virtual server on which the VM will be activated. In block 1320, the CNM receives a message from the CEM that includes a tenant ID, tenant MAC, and server MAC. In block 1325, the CNM performs a lookup in the SMVL table (which is a label mapping table that associates a VS MAC address with a VS to TORS label) and the TITL table. The CNM finds the link label of the VS to TORS in the SMVL table. The CNM finds the tenant label in the TITL table. In block 1330, the CNM records an association between the tenant ID, the VM MAC address, and the VS MAC address in the CNM mapping table.

In block 1335, the CNM sends a flow entry modification message to the VS to indicate that data packets matching an MPLS label, a VM MAC address, and the tenant specific label should be forwarded to the VM. In other words, if (at a destination switch) the first MPLS label matches the VS-TORS link label, the second MPLS label matches a tenant specific label, and the MAC matches the tenant VM MAC address, the MPLS labels are popped and forwarded to the tenant VM. This rule ensures that traffic to the VS incoming on the VS-TORS link is forwarded to the tenant VM if the packet has the proper MAC address.

In one embodiment, the CNM sends a flow entry modification message, in block 1340, to the VS to indicate that DHCP requests originating from the VM should be forwarded to the CNM. If the packet source MAC matches the tenant specific MAC and the destination port number matches the DHCP port number, the request is forwarded to the CNM. This rule allows the CNM to interpose on address lookup and configuration, respectively, so that routing modifications can be made in response. In one embodiment, DHCP uses the same port number as BOOTP, so this will be the BOOTP protocol port number.

In one embodiment, the CNM sends a flow entry modification message, in block 1345, to the VS to indicate that ARP requests originating from the VM should be forwarded to the CNM. If the packet source MAC matches the tenant specific MAC and the Ethertype matches ARP, the request is forwarded to the CNM. This rule allows the CNM to interpose on address lookup and configuration, respectively, so that routing modifications can be made in response.

Figure 14:
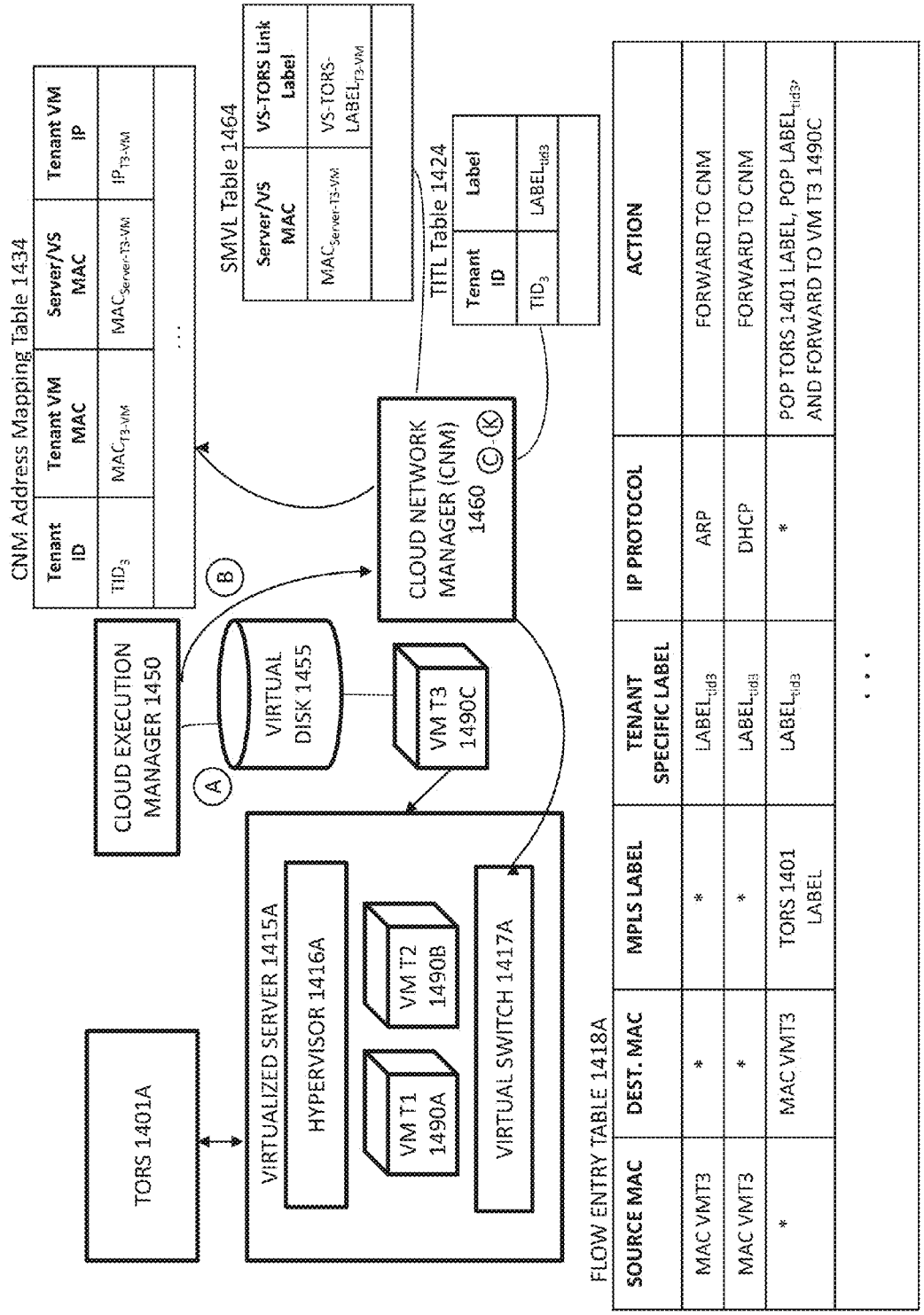
FIG. 14 illustrates a method for activating a virtual machine according to one embodiment.

FIG. 14 illustrates a method for activating a virtual machine according to one embodiment. In FIG. 14, a TORS 1401A is coupled with a virtualized server 1415A. The virtualized server 1415A comprises a hypervisor 1416A and a virtual switch 1417A. In FIG. 14, the virtualized server 1415A has two active VMs T1 and T2 1490A and 1490B. Further, FIG. 14 shows a CEM 1450, a virtual disk 1455, and a CNM 1460.

In FIG. 14, the CEM 1450 is scheduling a third VM T3 1490C for execution on the virtualized server 1415A. This figure illustrates various points during the activation of a virtual machine. At point A, the CEM 1450 schedules the VM T3 1490C, e.g., a VM belonging to Tenant 3 for execution. The object file is mapped from the virtual disk 1455 through the CEM's Object Manager. The CEM edits the VM 1490C stack to set the VM's 1490C MAC address to one of the MAC addresses assigned to Tenant 3. At point B, The CEM 1450 informs the CNM 1460 of the activation. It provides the CNM 1460 with the MAC address of the VM 1490C and the MAC address of the virtualized server 1415A on which the VM executes (which is the MAC address of the virtualized server's 1415A virtual switch 1417A), and the tenant's identifier.

At point C a notification that a VM, i.e., VM 1490C is scheduled for activation on a virtualized server 1415A is received by the CNM 1460. For example, the CEM 1450 notifies the CNM 1460 that the CEM 1450 has scheduled the VM 1490C for activation. At point D, the CNM 1460 determines the VM's 1490C MAC address. At point E, the CNM determines a virtual switch's MAC address corresponding with the virtual switch (VS) 1417A that resides on the virtual server 1415A on which the VM 1490C will be activated. At point F, the CNM 1460 receives a message from the CEM 1450 that includes a tenant ID, tenant MAC, and server MAC. At point G, the CNM performs a lookup in the SMVL table 1464 and the TITL table 1424. The CNM finds the link label of the VS to TORS in the SMVL table 1464. The CNM finds the tenant label in the TITL table 1424. At point H, the CNM 1460 records an association between the tenant ID, the VM MAC address, and the VS MAC address in the CNM mapping table 1434.

At point I, the CNM sends a flow entry modification message to the VS 1417A to indicate that data packets matching an MPLS label, a VM MAC address, and the tenant specific label should be forwarded to the VM. In other words, if the first MPLS label matches the VS-TORS link label, the second MPLS label matches a tenant specific label, and the MAC matches the tenant VM MAC address, the MPLS labels are popped and forwarded to the tenant VM. This rule ensures that traffic to the VS incoming on the VS-TORS link is forwarded to the tenant VM if the packet has the proper MAC address.

In one embodiment, the CNM 1460 sends a second flow entry modification message, at point J, to the VS 1417A to indicate that DHCP requests originating from the VM 1490C should be forwarded to the CNM 1460. If the packet source MAC matches the tenant specific MAC for VM 1490C and the destination port number matches the DHCP port number, the request is forwarded to the CNM 1460. This rule allows the CNM to interpose on address lookup and configuration, respectively, so that routing modifications can be made in response. In one embodiment, DHCP uses the same port number as BOOTP, so this will be the BOOTP protocol port number.

In one embodiment, the CNM sends a third flow entry modification message, at point K, to the VS 1417A to indicate that ARP requests originating from the VM 1490C should be forwarded to the CNM 1460. If the packet source MAC matches the tenant specific MAC for VM 1490C and the Ethertype matches ARP, the request is forwarded to the CNM 1460. This rule allows the CNM 1460 to interpose on address lookup and configuration, respectively, so that routing modifications can be made in response.

FIG. 14 illustrates three entries in a flow entry table 1418A of the virtual switch 1417A assuming that all three previously described flow entry modification messages were communicated. The flow entry table 1418A has six columns illustrated: a source MAC, destination MAC, MPLS label, tenant specific label, IP protocol, and action. The flow entries correspond to the activation of 1490C.

The first entry in flow entry table 1418A illustrated matches the MAC address of VM T3 1490C as a source MAC address. The destination MAC address and MPLS label are set to match any entry while the tenant specific label is set to match on Label$_{tid3}$ and the IP protocol is set to match on the ARP protocol. The action is then to forward to CNM 1460. This rule corresponds with step K described above.

The second entry in flow entry table 1418A illustrated matches the MAC address of VM T3 1490C as a source MAC address. The destination MAC address and MPLS label are set to match any entry while the tenant specific label is set to match on Label$_{tid3}$ and the IP protocol is set to match on the DHCP protocol. The action is then to forward to CNM 1460. This rule corresponds with step J described above.

The third entry in flow entry table 1418A illustrated matches all MAC addressed as a destination MAC address. The destination MAC address is set to match the MAC address of VM T3 1490C while one MPLS label is set to the VS-TORS 1401 link label, one is set to the tenant label MAC VM T3, and a third label, the tenant specific label is set to Label$_{tid3}$. The IP protocol is set to match on all entries. The action is then to pop the MPLS label and the tenant specific label and forward the packet to VM T3 1490C. This rule corresponds with step I described above.

As described above, a CNM maintains a mapping between a tenant ID, a VM MAC address, virtualized server MAC, and VM IP address. If a tenant has elected not to use DHCP addresses, then the CEM modifies the VM's IP stack prior to execution scheduling and installs a static IP address. However, in other embodiments a tenant will elect to use DHCP addresses. In such a case, the CNM will intercept DHCP requests and act as a relay.

Figure 15:
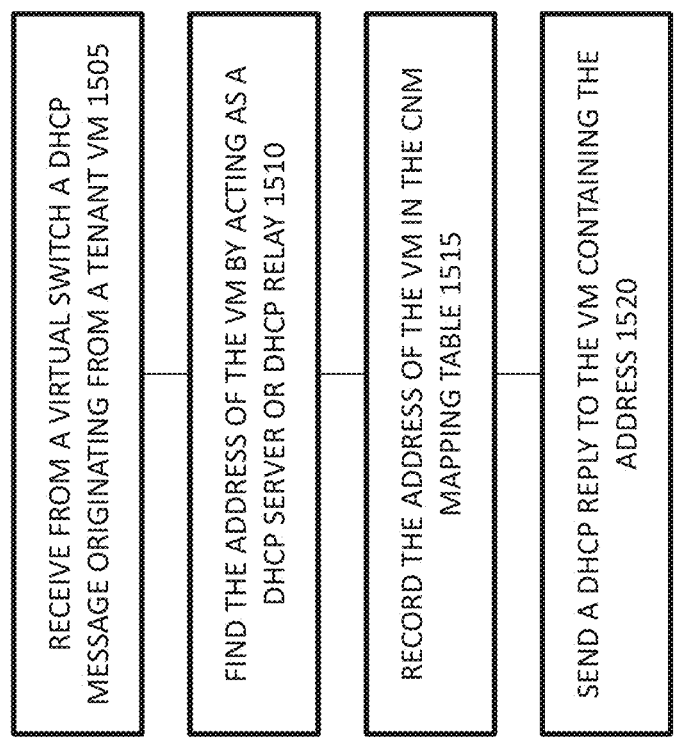
FIG. 15 illustrates a block diagram of a method for intercepting DHCP requests from a tenant VM according to one embodiment.

FIG. 15 illustrates a block diagram of a method for intercepting DHCP requests from a tenant VM according to one embodiment. A DHCP message is sent by a tenant VM. This DHCP message is intercepted by the virtual switch and forwarded from the virtual switch to the CNM. At block 1505, the CNM receives from the virtual switch the DHCP request that originated from the tenant VM. The CNM finds the address of the VM by acting as a DHCP server or a DHCP relay at block 1510. The CNM relays the DHCP request to a DHCP server in accordance with RFC 3046 at block. The CNM receives a DHCP reply from the DHCP server. At block 1515, the CNM records the address of the VM in the CNM mapping table. The CNM records an association in the CNM address mapping table between the tenant VM's MAC address and the IP address received in the DHCP reply. In accordance with certain embodiments, the association further includes the MAC address of the virtual server executing the tenant VM. At block 1520, the CNM forwards the DHCP reply to the tenant VM.

Figure 16:
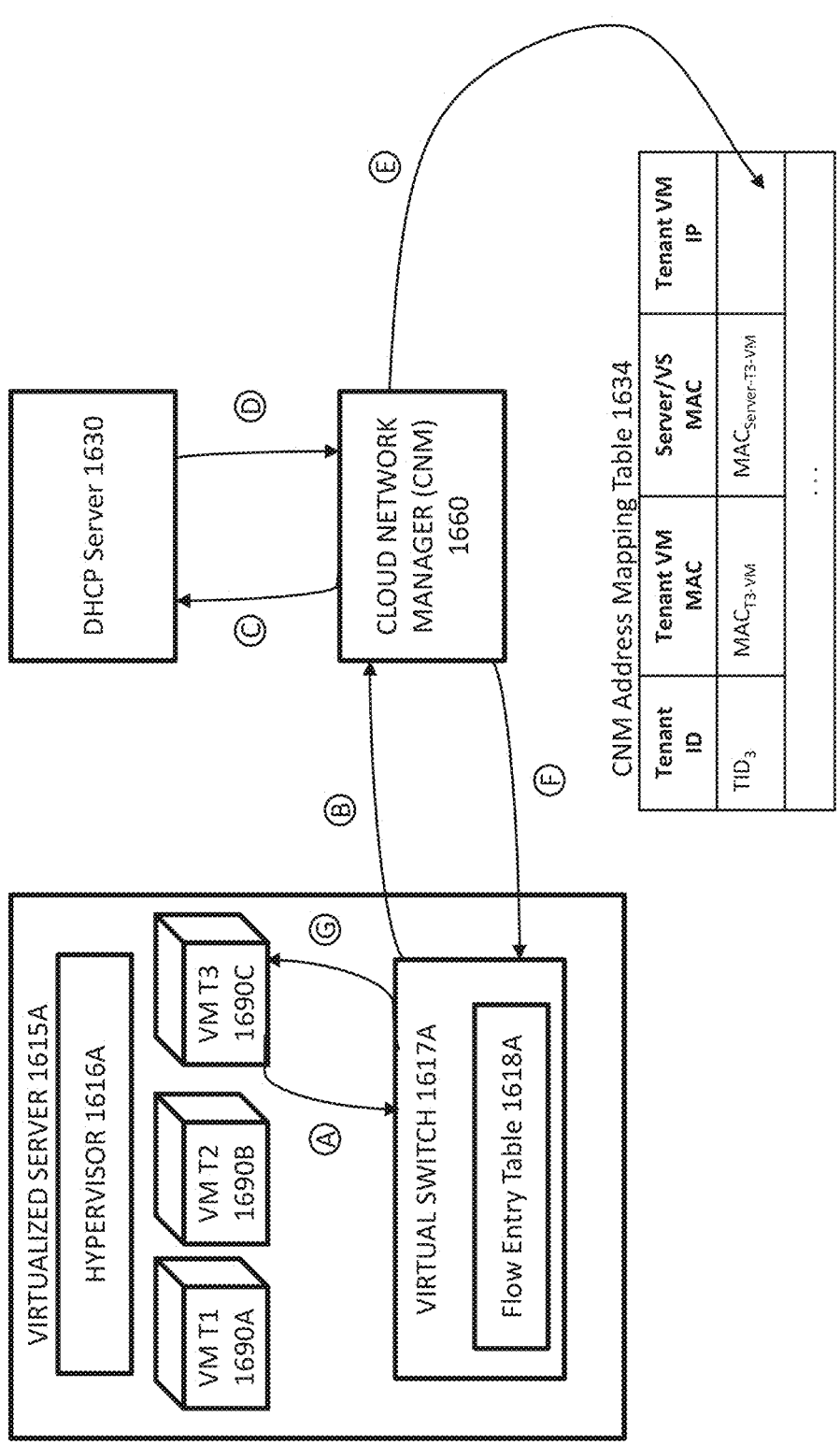
FIG. 16 illustrates a method for intercepting DHCP requests from a virtual machine according to one embodiment.

FIG. 16 illustrates a method for intercepting DHCP requests from a virtual machine according to one embodiment. In FIG. 6, a virtualized server 1615A comprises a hypervisor 1616A and a virtual switch 1617A. In FIG. 16, the virtualized server 1615A has three active VMs T1, T2, and T3 1690A-1690C. The virtual switch 1617A comprises a flow entry table 1618A that includes a rule to forward DHCP requests from VM T3 1690C to a CNM 1660 which is coupled with a DHCP server 1630.

This figure illustrates various points during the interception of a DHCP request from a virtual machine. At point A, the VM T3 1690C issues a DHCP Request to obtain an IP address and other configuration information, such as the DNS server. At point B, the virtual switch 1617A intercepts the DHCP request, e.g., message, and matches the request with a flow rule to route the DHCP request to the CNM 1660.

At point C, the CNM finds the address of the VM by acting as a DHCP server or a DHCP relay. In one embodiment, the CNM 1660 acts as a DHCP relay, inserts a standard DHCP Relay Option, and forwards the request to the tenant's DHCP server 1630. The CNM 1660 can determine which tenant the VM T3 1690C belongs to by examining the source MAC address of the DHCP request.

At point D, The tenant's DHCP server 1630 responds with a DHCP Reply containing an IP address for the VM T3 1690C and other configuration information. At point E, the CNM 1660 records the mapping between the VM T3 1690C MAC address and the IP address in the CNM's address mapping table 1634.

The CNM replies with a DHCP reply back to the VM containing the address. In one embodiment, at point F, the CNM 1660 strips off the DHCP Relay Option and forwards the DHCP reply to the virtual switch 1617A which forward the request back to VM T3 1690C at point G.

Figure 17:
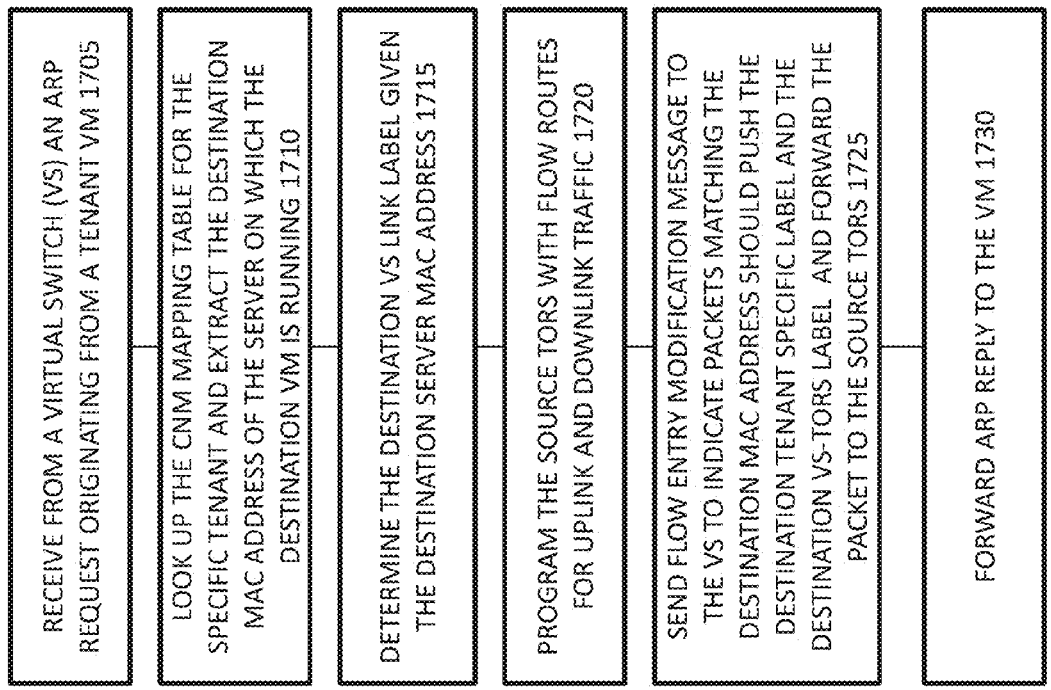
FIG. 17 illustrates a block diagram of a method for intercepting ARP requests from a VM when a specific tenant (identified by a specific label) tries to discover a destination IP address according to one embodiment.

FIG. 17 illustrates a block diagram of a method for intercepting ARP requests from a VM when a specific tenant (identified by a specific label) tries to discover a destination IP address according to one embodiment. At block 705, a CNM receives an ARP request that originated from a VM. The tenant sends out an ARP request with a destination IP address. The virtual switch intercepts the ARP request and sends the ARP request to the CNM running on the controller. The CNM looks up the CNM mapping table for the specific tenant and extracts the destination MAC address of the server on which the destination VM is running at block 710. At block 715, the CNM determines a destination VS link label using the destination server MAC address. The CNM uses the SMVL table in order to determine the VS link label. At block 1720, the CNM programs the source TORS with flow routes for uplink and downlink traffic. At block 1725, the CNM sends a flow entry modification message to the virtual switch on the virtual server that is executing the source VM. The flow entry modification message is sent to the VS to indicate that packets matching the destination MAC address should push the destination tenant specific label and the destination VS-TORS label and forward the packet to the source TORS. At block 1730, the CNM forwards an ARP reply to the specific tenant's VM with the correct MAC address for the given destination IP address.

Figure 18:
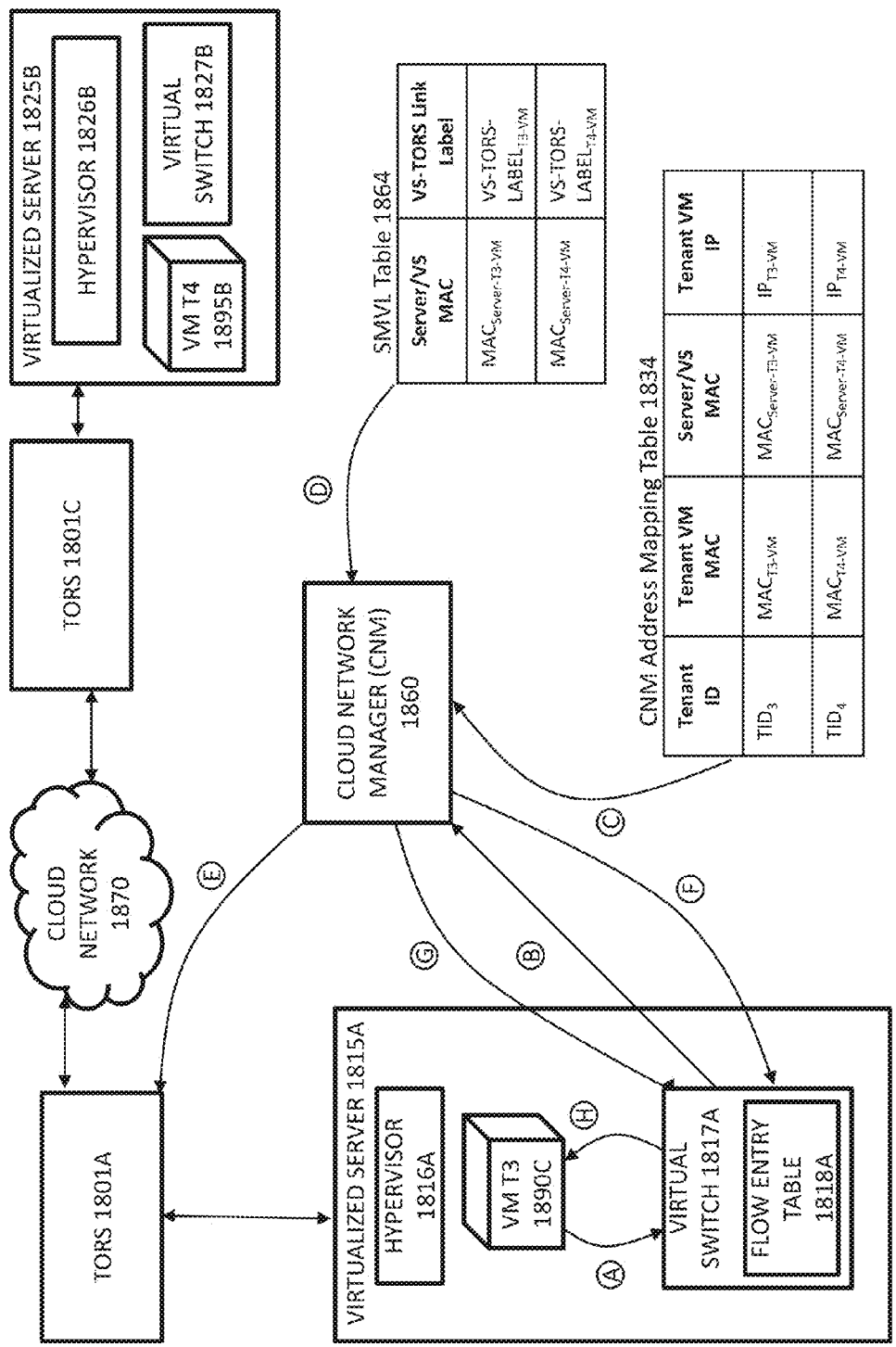
FIG. 18 illustrates a method for intercepting ARP requests from a virtual machine when a specific tenant (identified by a specific label) tries to discover a destination IP address according to one embodiment.

FIG. 18 illustrates a method for intercepting ARP requests from a virtual machine when a specific tenant (identified by a specific label) tries to discover a destination IP address according to one embodiment. In FIG. 18, a virtualized server 1815A comprises a hypervisor 1816A and a virtual switch 1817A. In FIG. 8, the virtualized server 1815A has an active VM T3 1890C. The virtual switch 1817A comprises a flow entry table 1818A that includes a rule to forward ARP requests from VM T3 1890C to a CNM 1860. The virtualized server 1816A is coupled with a TORS 1801A that is coupled to another TORS 1801C through a cloud network 1870. The TORS 1801C is coupled with a virtualized server 1825B that comprises a hypervisor 1826B and virtual switch 1827B. The virtualized server 1825B is executing VM T4 1895B.

This figure illustrates various points during the interception of an ARP request from a VM T3 1890C. At point A, the VM T3 1890C broadcasts an ARP request. The rest of the interception assumes that the ARP request indicates the IP address of a destination VM T4 1895B that resides on the virtual server 1825B. The virtual switch 1817A intercepts the ARP request and matches the request to a rule in the flow entry table 1818A that routes the ARP request to the CNM 1860 at point B.

At point C, the CNM 1860 uses the requested destination IP address ("DIP") as a key to look up a destination server MAC address ("DMAC") in the CNM's address mapping table 1834. At point D, the CNM determines the destination VS link label given the DMAC. The CNM uses the SMVL table in order to determine the VS link label. At point E, the CNM 1860 programs the source TORS 1801A with flow routes for uplink and downlink traffic. The VS link label describes the route between the TORS 1801A and VM T4 1895B at the DMAC virtualized server 1825B.

At point F, the CNM sends a flow entry modification message to the virtual switch 1817A on the virtual server that is executing the source VM 1890C. The flow entry modification message is sent to the VS 1817A to indicate that packets matching the destination MAC address should push the destination tenant specific label and the destination VS-TORS label and forward the packet to the source TORS 1801A. At point G, the CNM forwards an ARP reply to the virtual switch 1817A, which, in turn, forwards the ARP reply to the specific tenant's VM 1890C with the correct MAC address for the given destination IP address, at point H.

Figure 19:
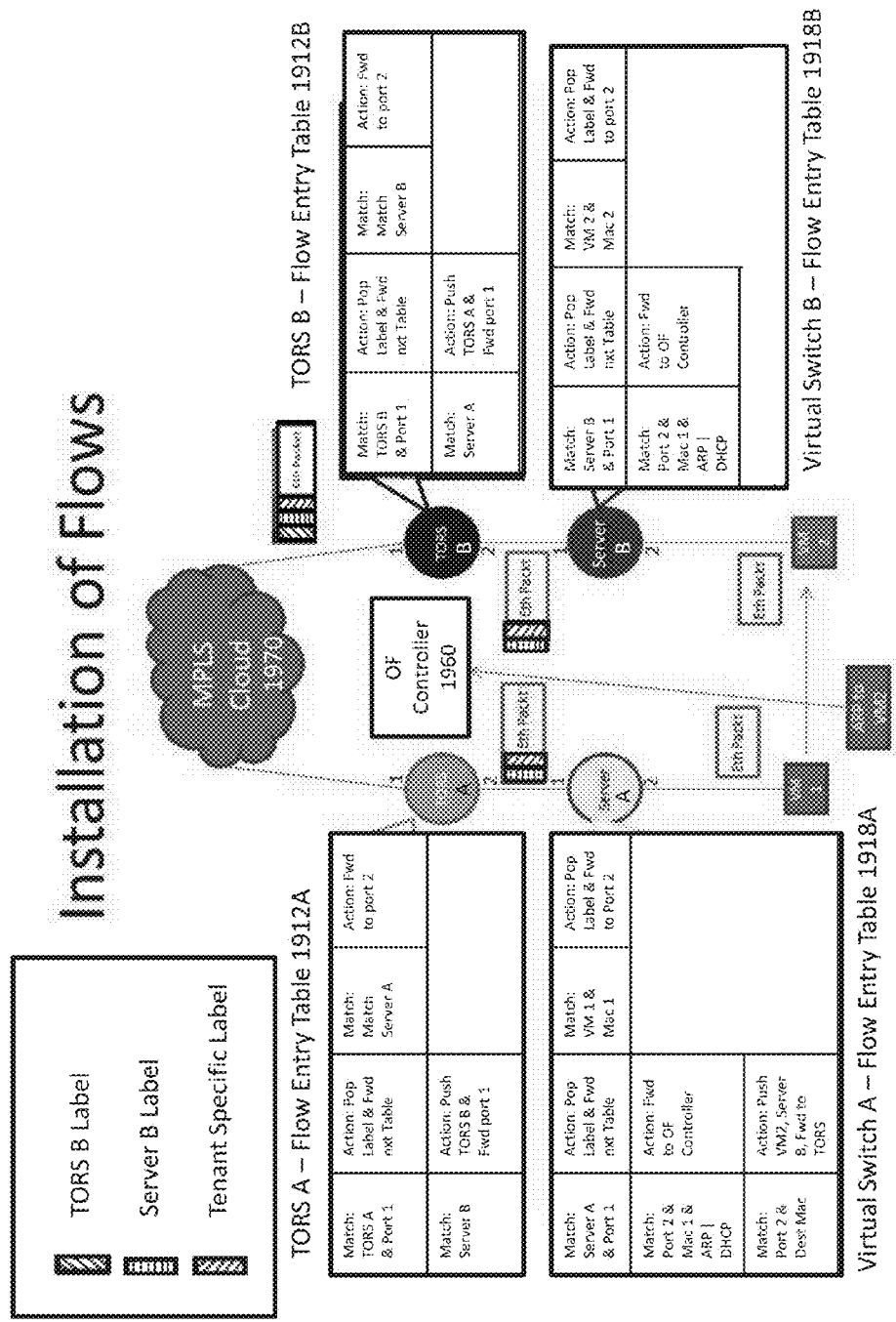
FIG. 19 illustrates the use the tenant label to forward traffic for a particular tenant VM's that are on different virtual switches separated by TORS.

FIG. 19 illustrates the use of the tenant label to forward traffic for a specific tenant's VM's according to one embodiment. The specific tenant's VM's are associated with different virtual switches separated by TORS. The OpenFlow rules must be programmed on the virtual switches and the TORS for traffic to be correctly forwarded. FIG. 19 illustrates a method for forwarding traffic from the tenant VM1 to the same tenant's VM2.

Virtual switch (VS) A on Server A has a flow entry table 1918A that includes forwarding instructions. When VS A receives a packet having a Server label that matches Server A on port 1, VS A pops Server A label and forwards a packet to the next table, e.g., to match a tenant specific label. When VS A matches VM1 and MAC address on a received packet, Mac1, VS A pops the tenant specific label and forwards to VM1 over port 2. When VS A receives a packet that matches on port 2, Mac1, and ARP or DHCP, VS A forwards the packet to the OF Controller 1960. When VS A receives a packet that matches on port 2 and a destination Mac address, VS A first pushes a tenant specific label for VM2, then pushes a label for Server B and forwards the packet to the source TORS.

TORS A has a flow entry table 1912A that includes forwarding instructions. When TORS A receives a packet that matches on Server B, TORS A pushes a label for TORS B for TORS to TORS forwarding over MPLS cloud 1970 and forwards the packet over port 1. When TORS A receives a packet that matches on port 1 and has a label that matches TORS A, TORS A pops the TORS A label and forwards to the next table. When the packet matches on Server A, TORS A forwards the packet to port 2.

Virtual switch (VS) B on Server B has a flow entry table 1918B that includes forwarding instructions. When VS B receives a packet having a Server label that matches Server B on port 1, VS B pops Server B label and forwards a packet to the next table, e.g., to match a tenant specific label. When VS B matches VM2 and MAC address on a received packet, Mac2, VS B pops the tenant specific label and forwards to VM2 over port 2. When VS B receives a packet that matches on port 2, Mac1, and ARP or DHCP, VS B forwards the packet to the OF Controller 1960.

TORS B has a flow entry table 1912B that includes forwarding instructions. When TORS B receives a packet that matches on Server A, TORS B pushes a label for TORS A for TORS to TORS forwarding over MPLS cloud 1970 and forwards the packet over port 1. When TORS B receives a packet that matches on port 1 and has a label that matches TORS B, TORS B pops the TORS B label and forwards to the next table. When the packet matches on Server B, TORS B forwards the packet to port 2.

FIG. 19 illustrates a virtualized server, Server A, which has tenant VM1. Server A is associated with TORS A. Virtualized server, Server B, has a virtual machine of the same tenant, VM2. Server B is associated with TORS B. As described earlier, VM1 can use ARP and Open Flow Controller 1960, e.g., a CNM, in order to discover a destination IP address and forward packets to a destination virtual machine, VM2, of the same tenant. Packets are forwarded from source TORS to destination TORS over MPLS cloud network 1970.

Tenant VM1 forwards a packet to Server A. Source virtual switch A matches on port and destination MAC using flow entry table 1918A. Source virtual switch A pushes two labels: a Server B label and a tenant specific label. In one embodiment, the tenant specific label is pushed first. Source virtual switch A then forwards the packet to the source TORS A. Source TORS A uses rules associated with Flow entry table 1912A in order to forward the packet. Source TORS A matches on the Server B label (e.g., the VS to TORS label associated with Server B's MAC address) and pushes a TORS B label for TORS to TORS forwarding. TORS A forwards the packet (with the TORS B label, the Server B label, and the tenant specific label) to TORS B over MPLS cloud 1970.

Destination TORS B matches on the TORS B label and port. Destination TORS B then pops the TORS B label and sends the packet to destination virtual switch B residing on Server B according to the rules in Flow entry table 1912B.

The destination virtual switch B matches on the Server B label and port and pops the Server B label. The destination virtual switch B matches on the tenant specific label and forwards the packet to the correct destination MAC address.

Figure 20:
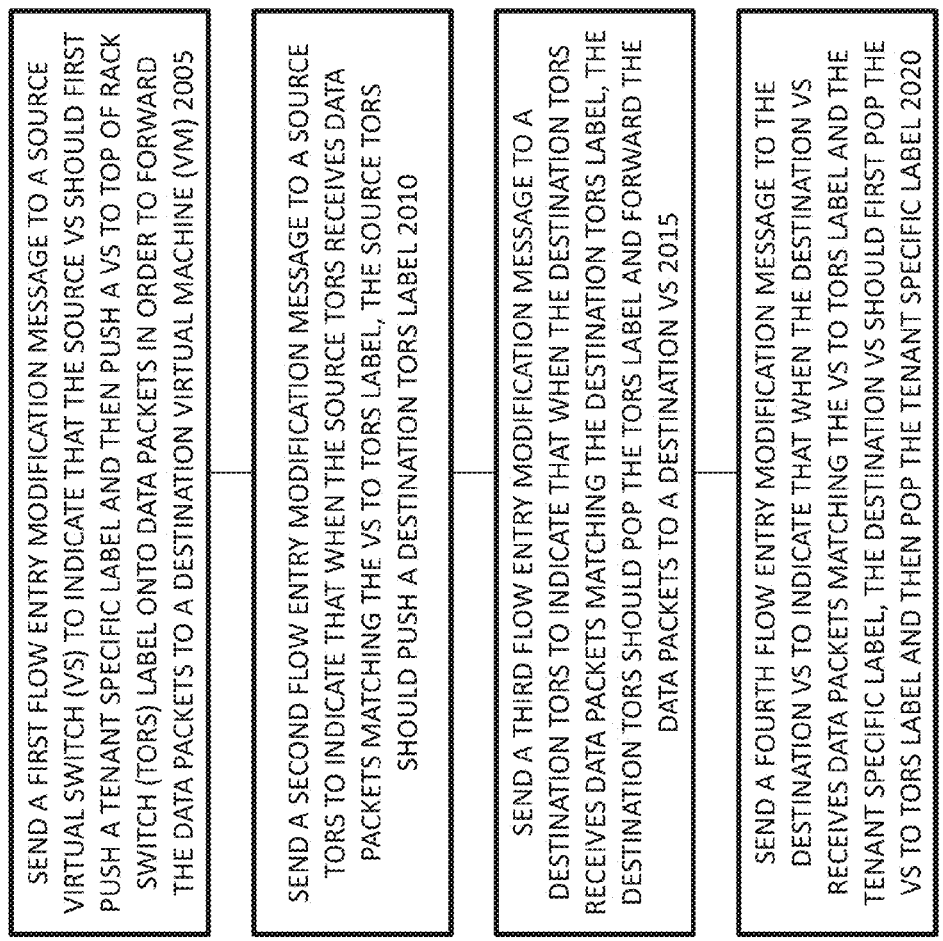
FIG. 20 illustrates

FIG. 20 illustrates a method for isolating tenant specific data using a cloud network manager (CNM). At block 2005, a first flow entry modification message is sent to a source virtual switch (VS) to indicate that the source VS should first push a tenant specific label and then push a VS to top of rack switch (TORS) label onto data packets in order to forward the data packets to a destination virtual machine (VM). At block 2010, a second flow entry modification message is sent to a source TORS to indicate that when the source TORS receives data packets matching the VS to TORS label, the source TORS should push a destination TORS label. At block 2015, a third flow entry modification message is sent to a destination TORS to indicate that when the destination TORS receives data packets matching the destination TORS label, the destination TORS should pop the TORS label and forward the data packets to a destination VS. At block 2020, a fourth flow entry modification message is sent to the destination VS to indicate that when the destination VS receives data packets matching the VS to TORS label and the tenant specific label, the destination VS should first pop the VS to TORS label and then pop the tenant specific label.

In response to the first flow entry modification message the source VS forwards the packets to a source TORS. In response to the second flow entry modification message, the source TORS forwards the data packets to a destination TORS using a cloud network. In response to the third flow entry modification message, the destination TORS forwards the data packets to a destination VS. In response to the fourth flow entry modification message, the destination VS forwards the packets to the destination VM. The CNM provides a destination Internet Protocol address to a source VM in order to allow the source VM to forward packets to a destination VM belonging to a same tenant.

Figure 21:
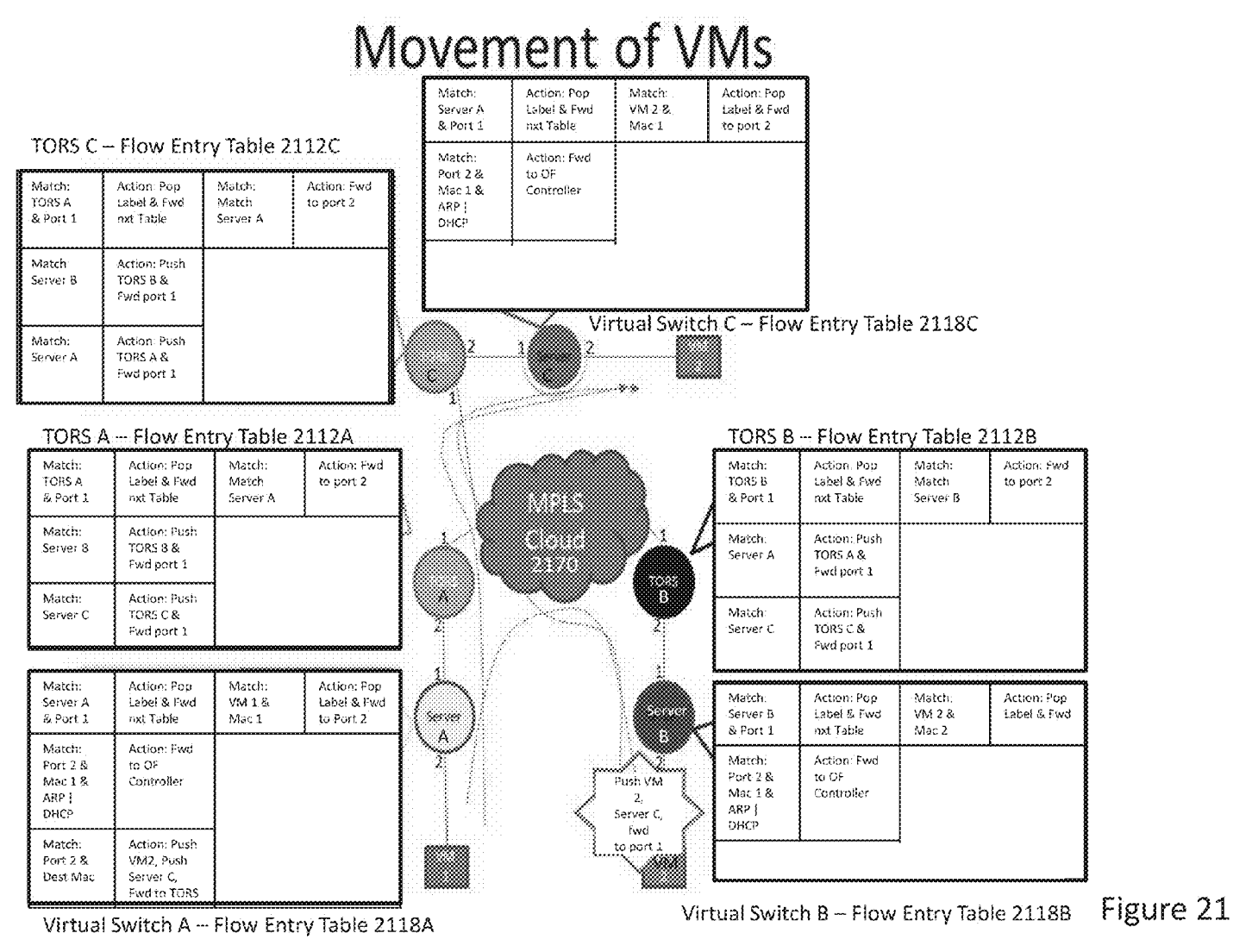

FIG. 21 illustrates a method for using tenant labels to forward traffic to a correct VM after the VM has been moved to a new server according to one embodiment. The specific tenant's VM's are associated with different virtual switches separated by TORS. The OpenFlow rules must be programmed on the virtual switches and the TORS for traffic to be correctly forwarded. FIG. 21 illustrates a method for forwarding traffic to a VM that has been moved.

Virtual switch (VS) A on Server A has a flow entry table 2118A that includes forwarding instructions. When VS A receives a packet having a Server label that matches Server A on port 1, VS A pops Server A label and forwards a packet to the next table, e.g., to match a tenant specific label. When VS A matches VM1 and MAC address, Mac1, on a received packet, VS A pops the tenant specific label and forwards to VM1 over port 2. When VS A receives a packet that matches on port 2, Mac1, and ARP or DHCP, VS A forwards the packet to the OF Controller (not shown). When VS A receives a packet that matches on port 2 and a destination Mac address, VS A first pushes a tenant specific label for VM2, then pushes a Server C label, and forwards the packet to the source TORS, TORS A.

TORS A has a flow entry table 2112A that includes forwarding instructions. When TORS A receives a packet that matches on Server B, TORS A pushes a label for TORS B for TORS to TORS forwarding over MPLS cloud 2170 and forwards the packet over port 1. When TORS A receives a packet that matches on Server C, TORS A pushes a label for TORS C and forwards the packet over port 1. When TORS A receives a packet that matches on port 1 and has a label that matches TORS A, TORS A pops the TORS A label and forwards to the next table. When the packet matches on Server A, TORS A forwards the packet to port 2.

Virtual switch (VS) B on Server B has a flow entry table 2118B that includes forwarding instructions. When VS B receives a packet having a Server label that matches Server B on port 1, VS B pops Server B label and forwards a packet to the next table, e.g., to match a tenant specific label. When VS B matches VM2 and MAC address, Mac2, on a received packet, VS B pops the tenant specific label and forwards according to new instructions. These new instructions include first pushing a VM2 (tenant specific) label, then pushing a Server C label, and forwarding the packet to port 1. When VS B receives a packet that matches on port 2, Mac1, and ARP or DHCP, VS B forwards the packet to the OF Controller (not shown).

TORS B has a flow entry table 2112B that includes forwarding instructions. When TORS B receives a packet that matches on Server A, TORS B pushes a label for TORS A for TORS to TORS forwarding over MPLS cloud 2170 and forwards the packet over port 1. When TORS B receives a packet that matches on Server C, TORS B pushes a label for TORS C for TORS to TORS forwarding over MPLS cloud 2170 and forwards the packet over port 1. When TORS B receives a packet that matches on port 1 and has a label that matches TORS B, TORS B pops the TORS B label and forwards to the next table. When the packet matches on Server B, TORS B forwards the packet to port 2.

Virtual switch (VS) C on Server C has a flow entry table 2118C that includes forwarding instructions. When VS C receives a packet having a Server label that matches Server A on port 1, VS C pops the Server A label and forwards the packet to the next table, e.g., to match a tenant specific label. When VS C matches VM2 and MAC address, Mac2, on a received packet, VS C pops the tenant specific label and forwards to port 2. When VS C receives a packet that matches on port 2, Mac1, and ARP or DHCP, VS C forwards the packet to the OF Controller (not shown).

TORS C has a flow entry table 2112C that includes forwarding instructions. When TORS C receives a packet that matches on Server A, TORS C pushes a label for TORS A for TORS to TORS forwarding over MPLS cloud 2170 and forwards the packet over port 1. When TORS C receives a packet that matches on Server B, TORS C pushes a label for TORS B for TORS to TORS forwarding over MPLS cloud 2170 and forwards the packet over port 1. When TORS C receives a packet that matches on port 1 and has a label that matches TORS A, TORS C pops the TORS A label and forwards to the next table. When the packet matches on Server A, TORS C forwards the packet to port 2.

FIG. 21 illustrates a virtualized server, Server A, which has tenant VM1. Server A is associated with TORS A. Virtualized server, Server B, has a virtual machine of the same tenant, VM2. Server B is associated with TORS B. When VM2 is moved from Server B to Server C, forwarding instructions are included in a flow entry table for VS B in order to assure that packets intended for VM2 are forwarded to Server C over MPLS cloud network 1970 and through TORS C.

FIG. 21 illustrates datapath flows when moving a VM. In this embodiment, tenant labels are used to forward traffic to the correct VM after the VM has been moved. As seen in FIG. 13, initially, traffic is going from VM1 associated with virtual switch A to VM2 on virtual switch B. Eventually the VM moves to virtual switch C and the traffic is moved appropriately to the correct virtual switch.

As stated above, initially, the flows are set up to send traffic from source tenant virtual machine, VM1, on VS A to destination virtual machine, VM2, on VS B.

When VM2 is moved from Server B to Server C, flow entry tables need to be modified in order to make sure packets meant for VM2 are sent to the correct place. Flow entry table 2118A on VS A is modified to push a label for VS C instead of VS B. An entry is added to flow entry table 2118C to match on the Server A label and then match on the tenant specific label VM2. VS C then pops the labels and forwards to the correct port on VS C. The entry on VS B that matches on traffic coming from VS A for VM2 is removed. Any interim packets received by VS B during the moving of VM2 can be forwarded by first pushing the tenant specific label, then pushing the label for server B and forwarding to TORS B for TORS to TORS forwarding to TORS C over MPLS cloud 2170.

Figure 22:
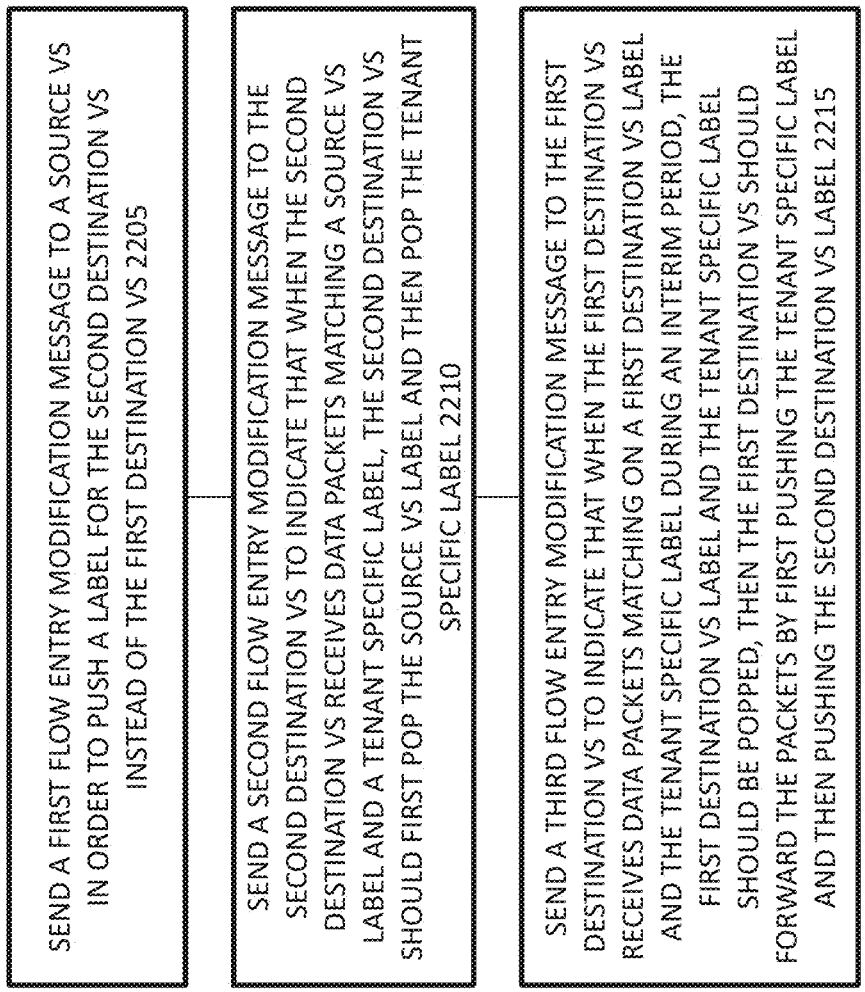
FIG. 22 illustrates a method of moving a destination VM from a first destination VS to a second destination VS using a CNM.

FIG. 22 illustrates a method of moving a destination VM from a first destination VS to a second destination VS using a CNM. At block 2205, a first flow entry modification message is sent to a source VS in order to push a label for the second destination VS instead of the first destination VS. At block 2210, a second flow entry modification message is sent to the second destination VS to indicate that when the second destination VS receives data packets matching a source VS label and a tenant specific label, the second destination VS should first pop the source VS label and then pop the tenant specific label. At block 2215, a third flow entry modification message is sent to the first destination VS to indicate that when the first destination VS receives data packets matching on a first destination VS label and the tenant specific label during an interim period, the first destination VS label and the tenant specific label should be popped, then the first destination VS should forward the packets by first pushing the tenant specific label and then pushing the second destination VS label.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for isolating tenant specific data using a cloud network manager (CNM), which comprises:
    maintaining a mapping among a plurality of items in a plurality of databases or tables, the plurality of databases or tables comprising a tenant database (DB), a tenant identifier to tenant label (TITL) table, a top of rack server label to virtual switch link label (TLVLL) table, a label mapping table (SMVL), and a CNM address mapping table;
    using the plurality of databases to generate tenant specific labels that are added to packets sent between tenant virtual machines (VMs).

2. The method of claim 1, wherein database accesses are performed prior to installing or uninstalling flows on Openflow switches.

3. The method of claim 1, wherein the CNM uses the TITL table to look up the tenant label using a tenant ID as a key.

4. The method of claim 1, wherein the CNM uses the TLVLL table to look up the virtual switch (VS) link label using the top of rack server (TORS) label as the key.

5. The method of claim 1, wherein the CNM uses the CNM address mapping table to maintain a mapping among a tenant ID, a tenant VM media access control (MAC) address, a tenant VM Internet Protocol (IP) address, and a server MAC address.

6. The method of claim 5, wherein there is one CNM address mapping table per tenant.

7. The method of claim 1, wherein tenant specific data is isolated by adding a tenant label as a forwarding entry.

8. The method of claim 7, wherein using the tenant label that has a tenant ID segregates and isolates tenant specific traffic to a respective VM.

9. The method of claim 8, wherein VMs that belong to different tenants have the same internet protocol and media access control addresses.

10. The method of claim 1, wherein the tenant DB keeps pointers to the CNM address mapping table.

11. The method of claim 10, wherein the CNM first performs a lookup to the tenant DB to find a tenant specific address mapping table before performing all other CNM address mapping table lookups.

* * * * *

UNITED STATES PATENT AND TRADEMARK OFFICE
CERTIFICATE OF CORRECTION

PATENT NO. : 9,250,941 B2  
APPLICATION NO. : 13/750325  
DATED : February 2, 2016  
INVENTOR(S) : Kempf et al.

It is certified that error appears in the above-identified patent and that said Letters Patent is hereby corrected as shown below:

IN THE SPECIFICATION

In Column 1, Line 12, delete "2011," and insert -- 2011, now Pat. No. 8,560,663, --, therefor.

In Column 6, Line 57, delete "illustrates FIG. 12 illustrates a" and insert -- illustrates a --, therefor.

In Column 9, Lines 1-2, delete "TORS 100A-100C" and insert -- TORS 101A-101C --, therefor.

In Column 9, Line 13, delete "TORS 100A-100C" and insert -- TORS 101A-101C --, therefor.

In Column 13, Line 20, delete "virtualized server 816A" and insert -- virtualized server 815A --, therefor.

In Column 14, Lines 62-63, delete "Multicast" and insert -- Multipath --, therefor.

In Column 16, Line 23, delete "9 T3 990C" and insert -- VM T3 990C --, therefor.

In Column 22, Lines 48-49, delete "virtualized server 1816A" and insert -- virtualized server 1815A --, therefor.

Signed and Sealed this  
Thirty-first Day of May, 2016

Michelle K. Lee  
*Director of the United States Patent and Trademark Office*